(12) United States Patent
Mitasaki et al.

(10) Patent No.: US 10,630,991 B2
(45) Date of Patent: Apr. 21, 2020

(54) IMAGE DIFFERENCE DETECTION DEVICE, METHOD FOR DETECTING IMAGE DIFFERENCE, AND COMPUTER PROGRAM

(71) Applicant: NIPPON TELEGRAPH AND TELEPHONE CORPORATION, Tokyo (JP)

(72) Inventors: Tokinobu Mitasaki, Yokosuka (JP); Kazuya Hayase, Yokosuka (JP); Atsushi Shimizu, Yokosuka (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 125 days.

(21) Appl. No.: 16/060,342

(22) PCT Filed: Dec. 14, 2016

(86) PCT No.: PCT/JP2016/087198
§ 371 (c)(1),
(2) Date: Jun. 7, 2018

(87) PCT Pub. No.: WO2017/104699
PCT Pub. Date: Jun. 22, 2017

(65) Prior Publication Data
US 2018/0367797 A1    Dec. 20, 2018

(30) Foreign Application Priority Data

Dec. 15, 2015 (JP) .................. 2015-244556
Jun. 30, 2016 (JP) .................. 2016-131155
Jun. 30, 2016 (JP) .................. 2016-131162

(51) Int. Cl.
*G06K 9/36* (2006.01)
*G06K 9/46* (2006.01)
(Continued)

(52) U.S. Cl.
CPC .............. *H04N 19/137* (2014.11); *G06T 7/11* (2017.01); *G06T 7/248* (2017.01); *H04N 19/126* (2014.11);
(Continued)

(58) Field of Classification Search
CPC .... H04N 19/137; H04N 19/48; H04N 19/176; H04N 19/14; H04N 19/126; H04N 7/18;
(Continued)

(56) References Cited

U.S. PATENT DOCUMENTS 5,253,075 A    10/1993  Sugiyama
5,614,960 A     3/1997  Chiba et al.
(Continued)

FOREIGN PATENT DOCUMENTS

EP          2120460 A1      11/2009
JP      H04-334270 A        11/1992
(Continued)

OTHER PUBLICATIONS

Extended European Search Report regarding EPSN 16875676.5, dated Mar. 22, 2019.
(Continued)

*Primary Examiner* — Samir A Ahmed
(74) *Attorney, Agent, or Firm* — Harness, Dickey & Pierce, P.L.C.

(57) ABSTRACT

An image difference detection device includes a detection unit configured to detect presence or absence of a difference between a first region within a first image and a second region corresponding to the first region within a second image on the basis of one or both of a code amount of each of encoded blocks in first and second encoded data obtained by encoding the first image and the second image and an index value obtained from encoding information of each of the encoded blocks.

17 Claims, 24 Drawing Sheets

(51) Int. Cl.
    *H04N 19/137*     (2014.01)
    *H04N 19/48*      (2014.01)
    *H04N 19/126*     (2014.01)
    *H04N 19/14*      (2014.01)
    *H04N 19/176*     (2014.01)
    *G06T 7/11*      (2017.01)
    *G06T 7/246*      (2017.01)
    *H04N 7/18*      (2006.01)

(52) U.S. Cl.
    CPC .......... *H04N 19/14* (2014.11); *H04N 19/176* (2014.11); *H04N 19/48* (2014.11); *H04N 7/18* (2013.01)

(58) Field of Classification Search
    CPC ...... H04N 19/51; H04N 19/593; G06T 7/248; G06T 7/11
    See application file for complete search history.

(56) References Cited

U.S. PATENT DOCUMENTS

| | | | |
|---|---|---|---|
| 8,509,549 B2 * | 8/2013 | Schoeberl | H04N 19/172 |
| | | | 382/103 |
| 2002/0106024 A1 | 8/2002 | Sato et al. | |
| 2003/0138149 A1 | 7/2003 | Iizuka et al. | |
| 2004/0086152 A1 | 5/2004 | Kakarala et al. | |
| 2004/0234144 A1 * | 11/2004 | Sugimoto | H04N 19/176 |
| | | | 382/239 |
| 2006/0179459 A1 | 8/2006 | Chiba | |
| 2012/0082343 A1 | 4/2012 | Schoeberl et al. | |
| 2015/0172717 A1 * | 6/2015 | Zhao | H04N 19/597 |
| | | | 375/240.16 |
| 2015/0195573 A1 * | 7/2015 | Aflaki Beni | H04N 19/513 |
| | | | 375/240.16 |
| 2015/0304665 A1 * | 10/2015 | Hannuksela | H04N 19/70 |
| | | | 375/240.02 |
| 2016/0050419 A1 * | 2/2016 | Zhao | H04N 19/597 |
| | | | 375/240.12 |
| 2016/0212446 A1 * | 7/2016 | Liu | H04N 19/70 |

FOREIGN PATENT DOCUMENTS

| | | |
|---|---|---|
| JP | H05-064016 A | 3/1993 |
| JP | H06-133305 A | 5/1994 |
| JP | 2002-112080 A | 4/2002 |
| JP | 2003-219424 A | 7/2003 |
| JP | 2004-153829 A | 5/2004 |
| JP | 2006-217343 A | 8/2006 |
| JP | 2006-311078 A | 11/2006 |
| JP | 2014-086913 A | 5/2014 |

OTHER PUBLICATIONS

International Search Report for PCT/JP2016/087198, ISA/JP, Tokyo, dated Feb. 28, 2017 with English translation.

* cited by examiner

IMAGE DIFFERENCE DETECTION DEVICE, METHOD FOR DETECTING IMAGE DIFFERENCE, AND COMPUTER PROGRAM

TECHNICAL FIELD

The present invention relates to technology for detecting a difference between two or more images.

This application is a 371 U.S. National Stage of International Application No. PCT/JP2016/087198, filed Dec. 14, 2016, which claims priority to Japanese Patent Application No. 2015-244556 filed on Dec. 15, 2015, Japanese Patent Application No. 2016-131155 filed on Jun. 30, 2016, and Japanese Patent Application No. 2016-131162 filed on Jun. 30, 2016, the contents of which are incorporated herein by reference.

BACKGROUND ART

In recent years, attention has been paid to technology for detecting a difference between two or more images such as event detection from a moving image for monitoring, abnormality detection in medical use, and change detection from an aerial or satellite image. Techniques for detecting the presence or absence of an event from a moving image have been proposed (for example, see Patent Document 1). In such techniques, whether or not there is a change in a target image is detected on the basis of a ratio between a complexity index value of a target image (calculated from a quantization step width and a generated code amount) and a complexity index value of an immediately previous image. That is, it is possible to detect a change in images in a time axis direction and the above-described technique can be applied to event detection from a monitoring moving image.

CITATION LIST

Patent Literature

[Patent Document 1]
Japanese Unexamined Patent Application, First Publication No. 2014-86913

SUMMARY OF INVENTION

Technical Problem

However, it is difficult to detect a region where a change has occurred within the image and it is difficult for the above-described technique to be applied to abnormality detection in the field of medicine or change detection from an aerial/satellite image. In particular, there is a problem in that it is difficult to perform abnormality detection in the field of medicine or change detection from an aerial/satellite image merely by segmenting the region (dividing the image into blocks and using the complexity index value of each block) in a video analysis device described in Patent Document 1. This is because only a change in a time axis direction is taken into account and no spatial change is taken into account. Thus, the characteristics of the entire image (e.g., brightness, a sense of detail, and the like) are slightly different and the complexity index value of each block is also different. There is a problem in that it is determined that a change is uniform in all blocks only by checking a ratio between a complexity index value of the same block spatially within an immediately previous image in a time axis direction and a complexity index value of a target block within a target image.

In view of the above-described circumstances, an objective of the present invention is to provide technology for detecting a difference between two or more images at a higher speed.

Solution to Problem

According to a first aspect of the present invention, an image difference detection device includes a detection unit configured to detect presence or absence of a difference between a first region within a first image and a second region corresponding to the first region within a second image on the basis of one or both of a code amount of each of encoded blocks in first and second encoded data obtained by encoding the first image and the second image and an index value obtained from encoding information of each of the encoded blocks.

According to a second aspect of the present invention, in the image difference detection device according to the first aspect, a variable length code is used in encoding used when the first and second encoded data is obtained.

According to a third aspect of the present invention, the image difference detection device according to the first or second aspect further includes an encoding information acquisition unit configured to acquire the encoding information of each of the encoded blocks from the first and second encoded data, wherein the detection unit is further configured to determine the presence or absence of the difference between the first region and the second region on the basis of the index value obtained from the encoding information acquired by the encoding information acquisition unit.

According to a fourth aspect of the present invention, the image difference detection device according to the first or second aspect further includes an input unit configured to input information for identifying each of the first and second regions between which the presence or absence of the difference is detected in the first and second images; and a region identification unit configured to identify each of the encoded blocks corresponding to the first and second regions identified on the basis of the information input by the input unit, wherein the detection unit is further configured to detect the presence or absence of the difference between the first and second regions identified on the basis of one or both of the code amount of the encoded block identified by the region identification unit and the index value obtained from the encoding information.

According to a fifth aspect of the present invention, in the image difference detection device according to the fourth aspect, the input unit is further configured to input position information indicating a position where there is a subject serving as a detection target of the difference in the first and second images as information for identifying the first and second regions.

According to a sixth aspect of the present invention, the image difference detection device according to the first aspect further includes a classification unit configured to classify the encoded blocks into a plurality of categories on the basis of the encoding information obtained when a plurality of encoded blocks obtained by dividing each of the first and second images are encoded, wherein the detection unit is further configured to determine a threshold value for use in a determination of the presence or absence of the difference between the first region and the second region on the basis of a classification result of the classification unit, and wherein the detection unit is further configured to determine the presence or absence of the difference between the first region and the second region on the basis of one or both of the code amount and the index value and the determined threshold value.

According to a seventh aspect of the present invention, the image difference detection device according to the first aspect further includes a classification unit configured to classify the encoded blocks into a plurality of categories on the basis of the encoding information obtained when a plurality of encoded blocks obtained by dividing each of the first and second images are encoded, wherein the detection unit is further configured to determine a determination condition for use in the determination of the presence or absence of the difference between the first region and the second region on the basis of a classification result of the classification unit, and wherein the detection unit is further configured to determine the presence or absence of the difference between the first region and the second region on the basis of one or both of the code amount and the index value and the determined determination condition.

According to an eighth aspect of the present invention, in the image difference detection device according to the sixth or seventh aspect, the classification unit is further configured to classify the encoded blocks into the plurality of categories on the basis of a degree of complexity of an image obtained from the encoding information.

According to a ninth aspect of the present invention, in the image difference detection device according to the sixth or seventh aspect, the plurality of categories include a flat region and a complex region, and the classification unit is further configured to classify each of the encoded blocks as the flat region or the complex region on the basis of the degree of complexity of an image obtained from the encoding information.

According to a tenth aspect of the present invention, the image difference detection device according to the first aspect further includes a type input unit configured to input type information indicating a characteristic of the difference detected between the first and second images; a parameter determination unit configured to determine a quantization matrix on the basis of the type information; and an encoding unit configured to divide each of the first and second images into a plurality of encoded blocks and encode each of the plurality of encoded blocks on the basis of the quantization matrix to generate the first and second encoded data.

According to an eleventh aspect of the present invention, the image difference detection device according to the first aspect further includes a starting point input unit configured to input a plurality of starting points at which encoding starts in the first and second images; and an encoding unit configured to divide each of the first and second images into a plurality of encoded blocks on the basis of the starting points and encode the encoded blocks to generate the first and second encoded data for each starting point, wherein the detection unit is further configured to determine the presence or absence of the difference between the first region and the second region on the basis of the index value obtained from the encoding information calculated for each encoded block in a process of encoding each of the first and second images.

According to a twelfth aspect of the present invention, the image difference detection device according to the first aspect further includes a correction unit configured to correct the index value on the basis of a difference between a position of the encoded block in the first image and a position of the encoded block in the second image when the first and second images are encoded, wherein the detection unit is further configured to determine the presence or absence of the difference between the first region and the second region on the basis of the index value corrected by the correction unit.

According to a thirteenth aspect of the present invention, in the image difference detection device according to the twelfth aspect, the correction unit is further configured to select at least one coefficient from a plurality of predetermined coefficients on the basis of the difference and correct the index value by using the selected coefficient.

According to a fourteenth aspect of the present invention, the image difference detection device according to the first aspect further includes an adjustment unit configured to adjust a code amount of each of the encoded blocks in the first encoded data or the second encoded data on the basis of a ratio between total code amounts of the first and second encoded data, wherein the detection unit is further configured to determine the presence or absence of the difference between the first region and the second region on the basis of the code amount adjusted by the adjustment unit.

According to a fifteenth aspect of the present invention, in the image difference detection device according to the fourteenth aspect, the adjustment unit is further configured to determine that the first image and the second image are entirely different images or that detection of the difference therebetween is impossible if the ratio between the total code amounts of the first and second encoded data exceeds a predetermined value.

According to a sixteenth aspect of the present invention, an image difference detection method includes a detection step of detecting presence or absence of a difference between a first region within a first image and a second region corresponding to the first region within a second image on the basis of one or both of a code amount of each of encoded blocks in first and second encoded data obtained by encoding the first image and the second image and an index value obtained from encoding information of each of the encoded blocks.

According to a seventeenth aspect of the present invention, a computer program is configured to cause a computer to function as: a detection unit configured to detect presence or absence of a difference between a first region within a first image and a second region corresponding to the first region within a second image on the basis of one or both of a code amount of each of encoded blocks in first and second encoded data obtained by encoding the first image and the second image and an index value obtained from encoding information of each of the encoded blocks.

Advantageous Effects of Invention

According to the present invention, it is possible to detect a difference between two or more images at a higher speed.

DESCRIPTION OF EMBODIMENTS

Hereinafter, image difference detection devices according to embodiments of the present invention will be described with reference to the drawings. The image difference detection devices according to the embodiments appropriately detect a change (or a difference) in each region within an image from two or more images and can also be applied to change detection from abnormality detection in the field of medicine and change detection from an aerial/satellite image.

<First Embodiment>

Figure 1:
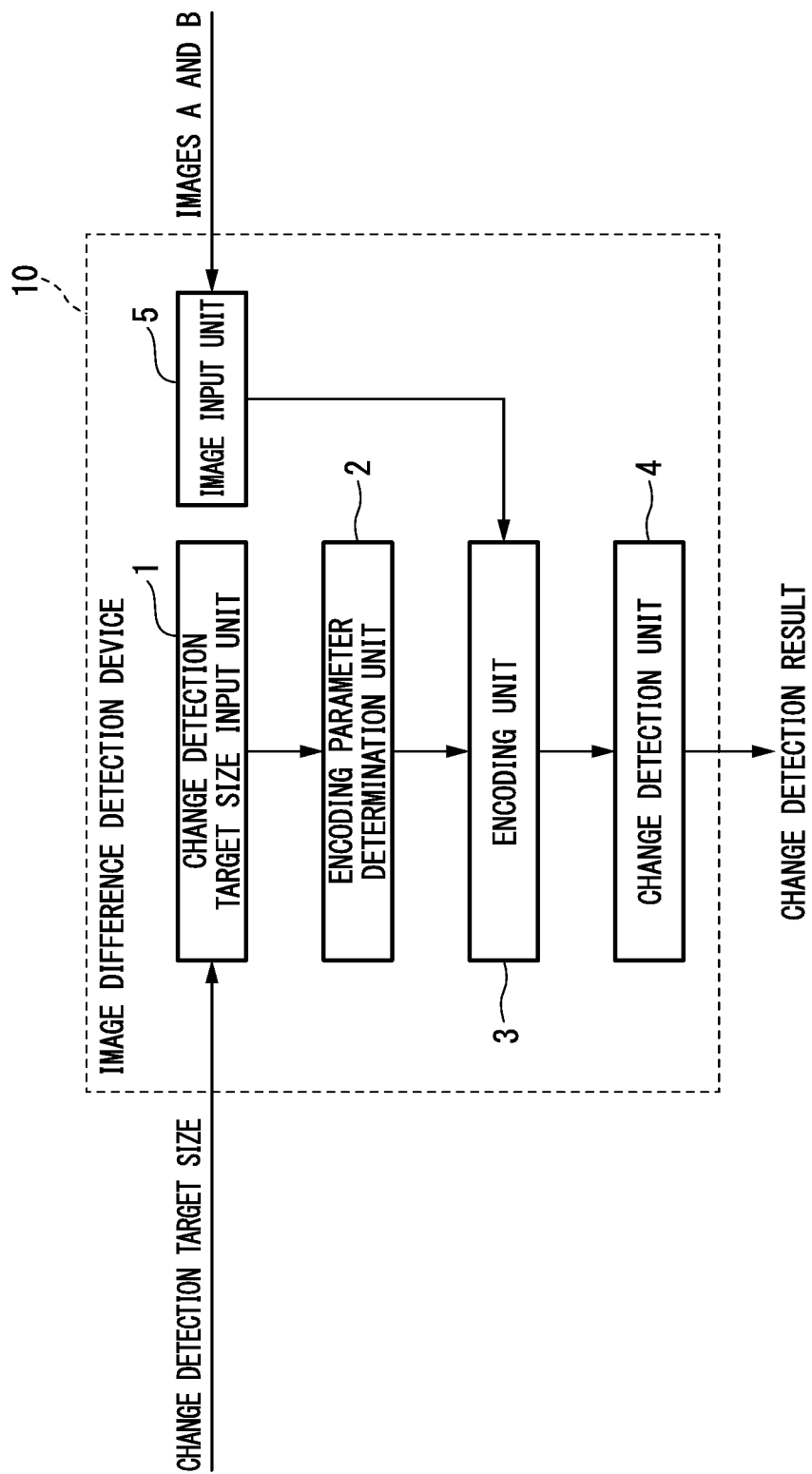
FIG. 1 is a block diagram showing a configuration of an image difference detection device according to a first embodiment of the present invention.
Figure 2:
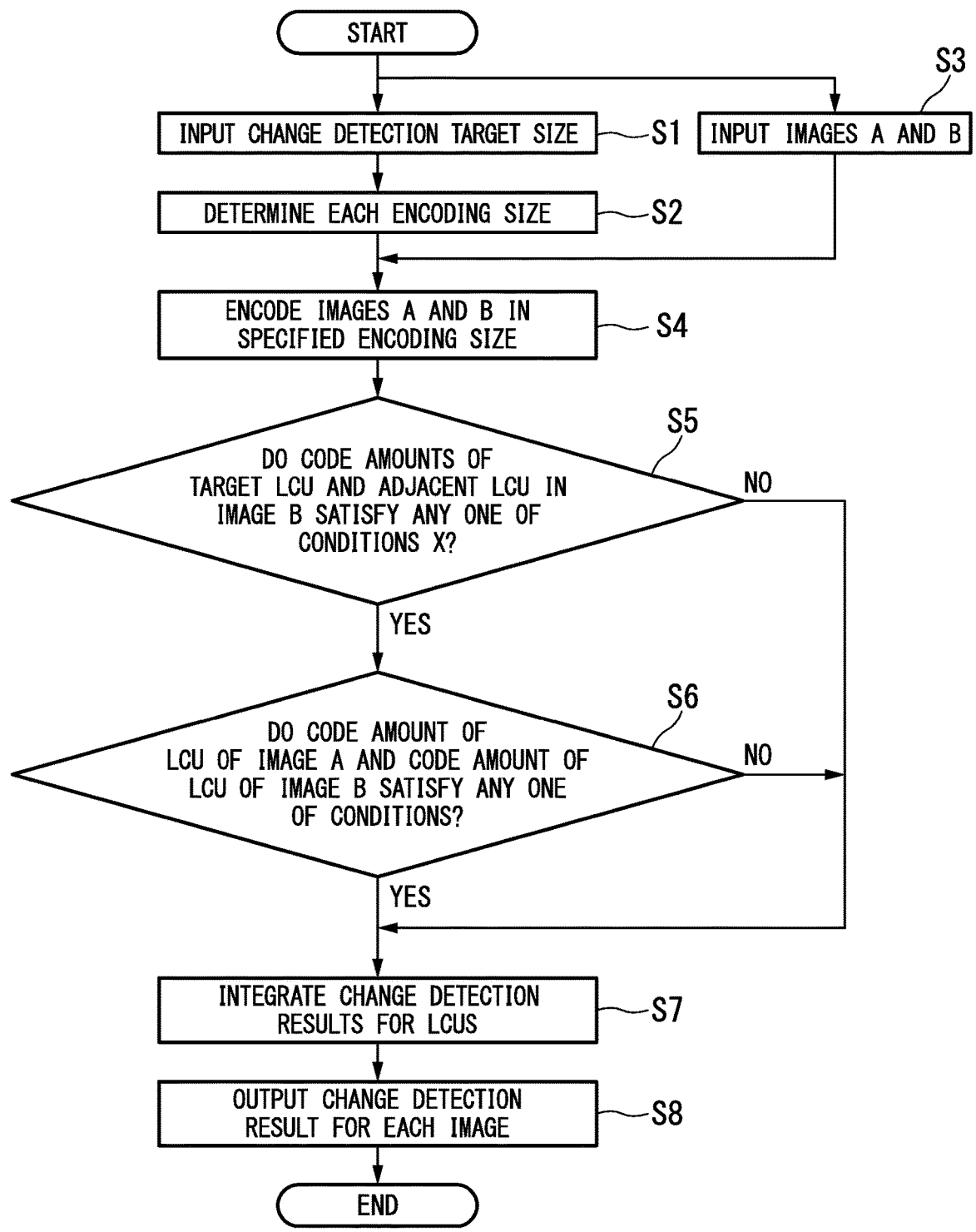
FIG. 2 is a flowchart showing a processing operation of the image difference detection device shown in FIG. 1.

An image difference detection device according to a first embodiment will be described. Hereinafter, change point detection between satellite images using moving image encoding will be described as an example. FIG. 1 is a block diagram showing a configuration of an image difference detection device 10 according to the first embodiment. FIG. 2 is a flowchart showing a processing operation of the image difference detection device 10 shown in FIG. 1. The image difference detection device 10 shown in FIG. 1 includes a computer device. The image difference detection device 10 includes a change detection target size input unit 1, an encoding parameter determination unit 2, an encoding unit 3, a change detection unit 4, and an image input unit 5. Here, an operation in which the image difference detection device 10 detects a region having a change in an image B with respect to an image A (a spatial region having a difference between two images) will be described. Also, hereinafter, a case in which an encoding scheme used by the image difference detection device 10 is HEVC and an encoding parameter includes an encoding size will be described as an example.

The processing operation of the image difference detection device 10 shown in FIG. 1 will be described. The change detection target size input unit 1 inputs a size (e.g., a pixel size) of a change target desired to be detected from an outside and outputs the size of the change target to the encoding parameter determination unit 2 (step S1). Although the size of the change target may be a pixel size as an example, the present invention is not limited to the pixel size as long as the size is an index for designating a range on the image. Subsequently, the encoding parameter determination unit 2 determines an encoding parameter, for example, each encoding size, in accordance with a size of the input change target (step S2). Each encoding size is a size of a macro block (MB) of MPEG or the like, a coding unit (CU), a prediction unit (PU), or a transform unit (TU) of HEVC, or the like. Here, a largest CU (LCU) size will be described as an example of the encoding size. The encoding parameter determination unit 2 outputs the determined LCU size to the encoding unit 3.

On the other hand, the image input unit 5 inputs at least two images, an image A (a first image) and an image B (a second image), to be subjected to change detection from an outside (step S3). Although the photographing dates and times of the images A and B are different, spatial regions of the photographing ranges of the images A and B are the same. The image A is an image captured at an earlier date and time than the image B. The images A and B are output to the encoding unit 3. The encoding unit 3 performs HEVC intra-encoding of the image A and the image B with the input LCU size (step S4).

A process of detecting whether or not there is a change (a difference) in each LCU in the change detection unit 4 shown in FIG. 1 will be described. First, the change detection unit 4 compares a code amount of the target LCU in the detection target image with a code amount of an LCU adjacent to the target LCU in four directions (up, down, right and left), and the change detection unit 4 determines which of the following conditions X ((1) to (8)) is satisfied (step S5).

$$\max(R(N-1)/\ R(N),\ R(N)/\ R(N-1))>R\_Th1 \quad (1)$$

$$\max(R(N+1)/\ R(N),\ R(N)/\ R(N+1))>R\_Th1 \quad (2)$$

$$\max(R(N-x)/\ R(N),\ R(N)/\ R(N-x))>R\_Th1 \quad (3)$$

$$\max(R(N+x)/\ R(N),\ R(N)/\ R(N+x))>R\_Th1 \quad (4)$$

$$\min(R(N-1)/\ R(N),\ R(N)/\ R(N-1))<R\_Th2 \quad (5)$$

$$\min(R(N+1)/\ R(N),\ R(N)/\ R(N+1))<R\_Th2 \quad (6)$$

$$\min(R(N-x)/\ R(N),\ R(N)/\ R(N-x))<R\_Th2 \quad (7)$$

$$\min(R(N+x)/\ R(N),\ R(N)/\ R(N+x))<R\_Th2 \quad (8)$$

Here, R denotes a code amount of an LCU. max(R(N−1), R(N)) denotes the larger one of R(N−1) and R(N). min(R(N−1), R(N)) denotes the smaller one of R(N−1) and R(N). R_Th1 is a threshold value that satisfies R_Th1>1. R_Th2 is a threshold value that satisfies 0<R_Th2≤1. Also, N denotes an N-th LCU in the image B, and the N-th LCU is a target LCU. N−1 denotes an LCU adjacent to the left of the target LCU. N+1 denotes an LCU adjacent to the right of the target LCU. N−x denotes an LCU adjacent above the target LCU. N+x denotes an LCU adjacent under the target LCU. In this case, a calculation target of a ratio of code amounts is the image B.

If the target LCU does not satisfy all of the conditions X (code amounts of adjacent LCUs above, below, and to the right and left are not significantly different from the code amount of the target LCU) (NO in step S5), the change detection unit 4 determines that there is no change in the target LCU and stores a result of detecting the target LCU within the change detection unit 4 (step S7).

On the other hand, if any one of the conditions X is satisfied (YES in step S5), the change detection unit 4 compares a code amount of the LCU in the image A spatially located at the same position as the target LCU in the image B with a code amount of the target LCU. Then, on the basis of the code amount of the LCU of the image A spatially located at the same spatial position as the target LCU of the image B and the code amount of the target LCU of the image B, the change detection unit 4 confirms whether either of the following conditions Y ((9) and (10)) is satisfied (step S6).

$$\max(R\_A(N)/\ R\_B(N),\ R\_B(N)/\ R\_A(N))>R\_Th3 \quad (9)$$

$$\min(R\_A(N)/\ R\_B(N),\ R\_B(N)/\ R\_A(N))<R\_Th4 \quad (10)$$

Here, R_B denotes a code amount of the target LCU, and R_A denotes a code amount of the LCU in the image A spatially at the same position as the target LCU. R_Th3 is a threshold value that satisfies R_Th3>1, and R_Th4 is a threshold value that satisfies 0<R_Th4≤1.

If the target LCU does not satisfy all the conditions Y (the code amount of the target LCU is not significantly different from the code amount of the LCU in the image A spatially located at the same position as the target LCU) (NO in step S6), the change detection unit 4 determines that there is no change in the target LCU and stores the result of detecting the target LCU within the change detection unit 4 (step S7).

On the other hand, if any one of the conditions Y is satisfied (YES in step S6), the change detection unit 4 determines that there is a change in the target LCU and similarly stores the detection result (step S7). Then, at a point in time when the above-described processing (steps S5, S6, and S7) is iterated and completed for all the LCUs in the image B, the change detection unit 4 outputs a result of detecting a change in the target image (here, the image B) and the process is completed (step S8). If input images are an image A and two or more images B instead of two images A and B, results of detecting the images B are output.

<Second Embodiment>

Figure 3:
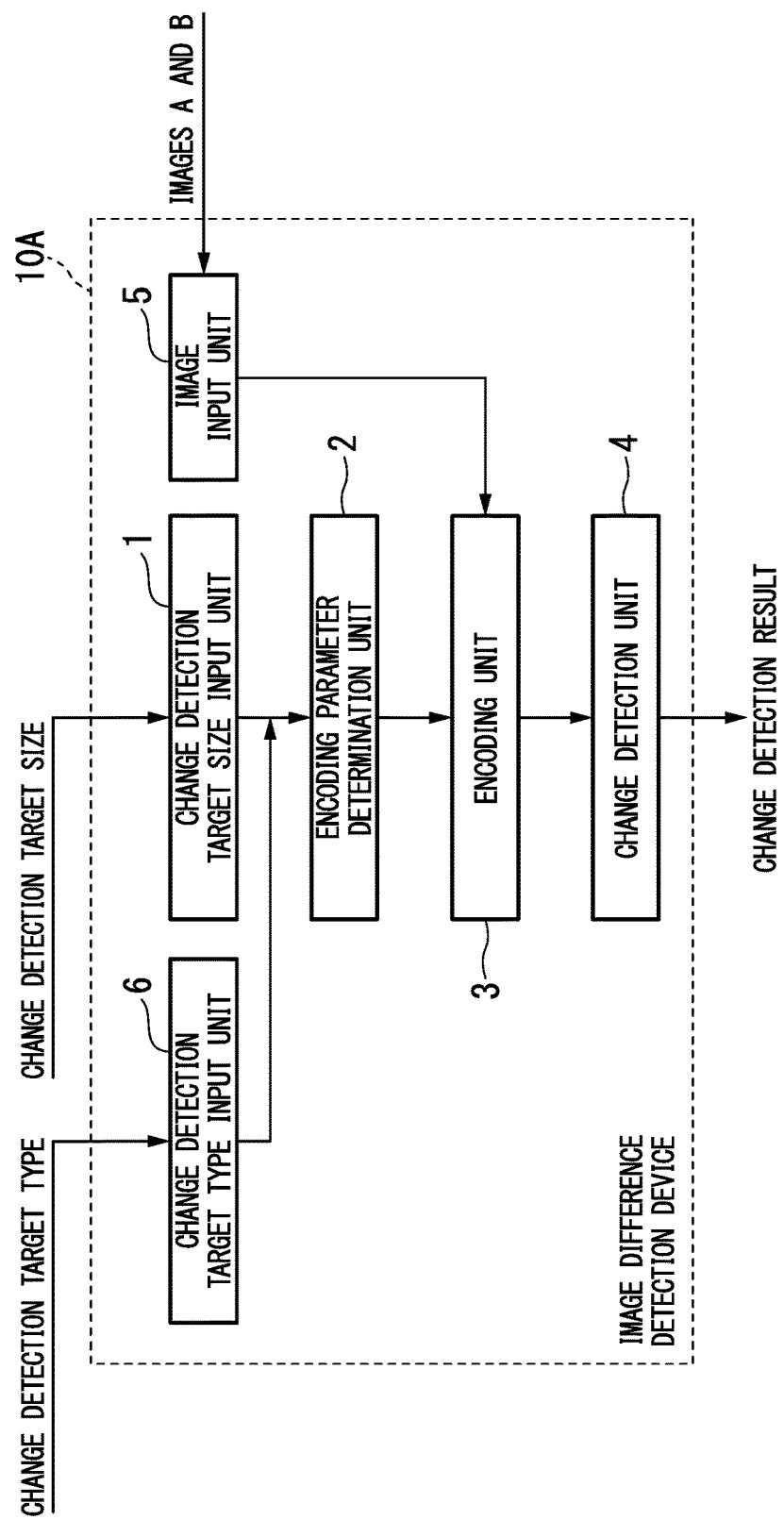
FIG. 3 is a block diagram showing a configuration of an image difference detection device according to a second embodiment of the present invention.
Figure 4:
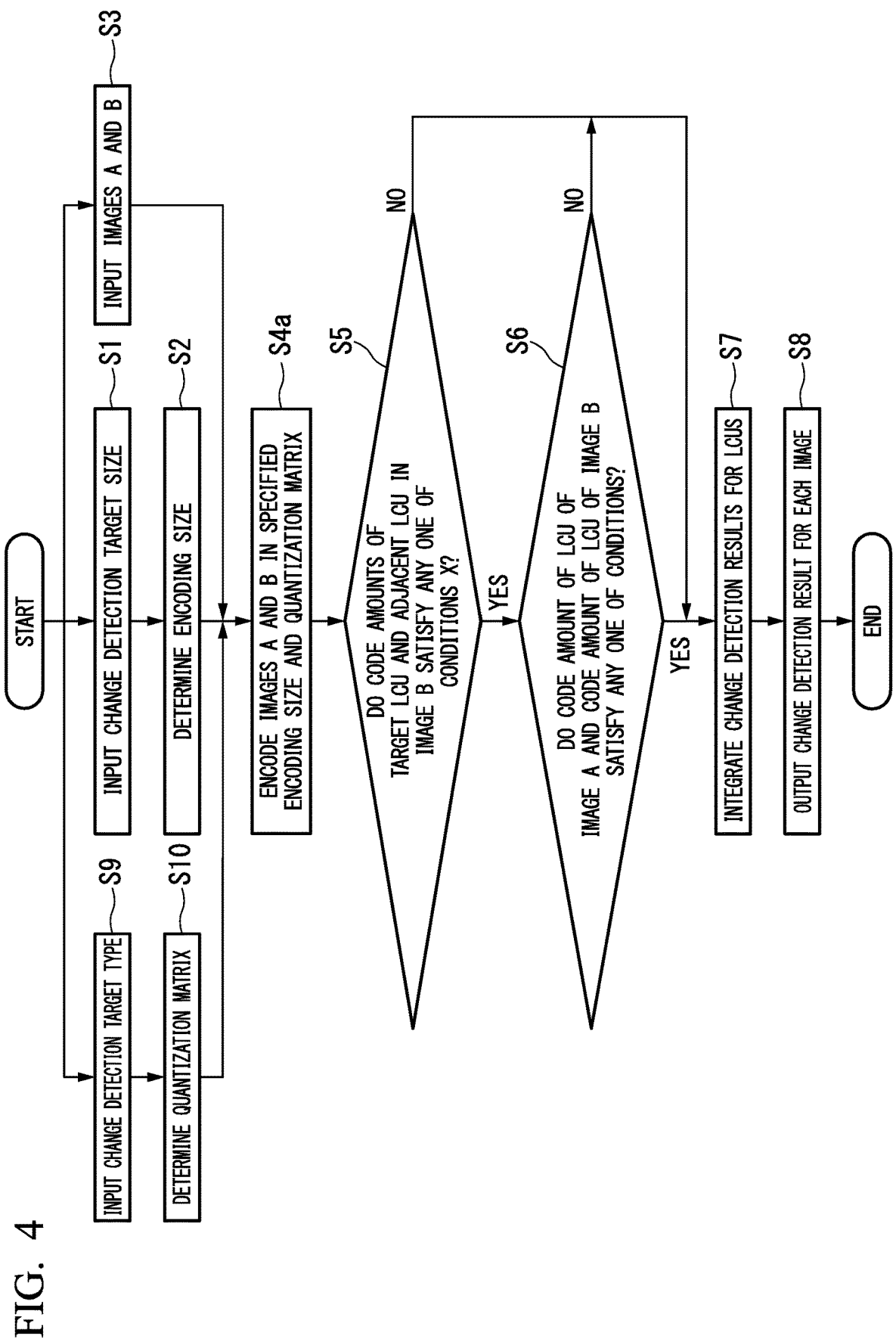
FIG. 4 is a flowchart showing a processing operation of the image difference detection device shown in FIG. 3.

Next, an image difference detection device according to a second embodiment will be described. FIG. 3 is a block diagram showing a configuration of an image difference detection device 10A according to the second embodiment. The same parts as those of the image difference detection device 10 shown in FIG. 1 are denoted by the same reference signs in FIG. 3 and description thereof will be omitted. The image difference detection device 10A shown in FIG. 3 is different from the image difference detection device 10 shown in FIG. 1 in that a change detection target type input unit 6 is newly provided. FIG. 4 is a flowchart showing a processing operation of the image difference detection device 10A shown in FIG. 3. The same parts as those of the processing operation shown in FIG. 2 are denoted by the same reference signs in FIG. 4 and description thereof will be omitted. The processing operation shown in FIG. 4 is different from the processing operation shown in FIG. 2 in that steps S4a, S9, and S10 are provided.

In the first embodiment, only a change detection target size is input to the encoding parameter determination unit 2. In the second embodiment, in addition to the change detection target size, a change detection target type which is a type of change detection target (a cloud, a building, a sea, or the like from a satellite image or the like) input by the change detection target type input unit 6 from an outside is input to the encoding parameter determination unit 2 (step S9). Then, the encoding parameter determination unit 2 determines a quantization matrix or the like to be used at the time of encoding in accordance with the change detection target type (step S10). In response to this, the encoding unit 3 encodes the image A and the image B with the encoding size and the quantization matrix specified by the encoding parameter determination unit 2 (step S4a). The added processing operation leads to high detection accuracy. For example, if a change detection target type with a remarkable edge is specified, the encoding parameter determination unit 2 selects a quantization matrix such that high frequency components are emphasized.

<Third Embodiment>

Figure 5:
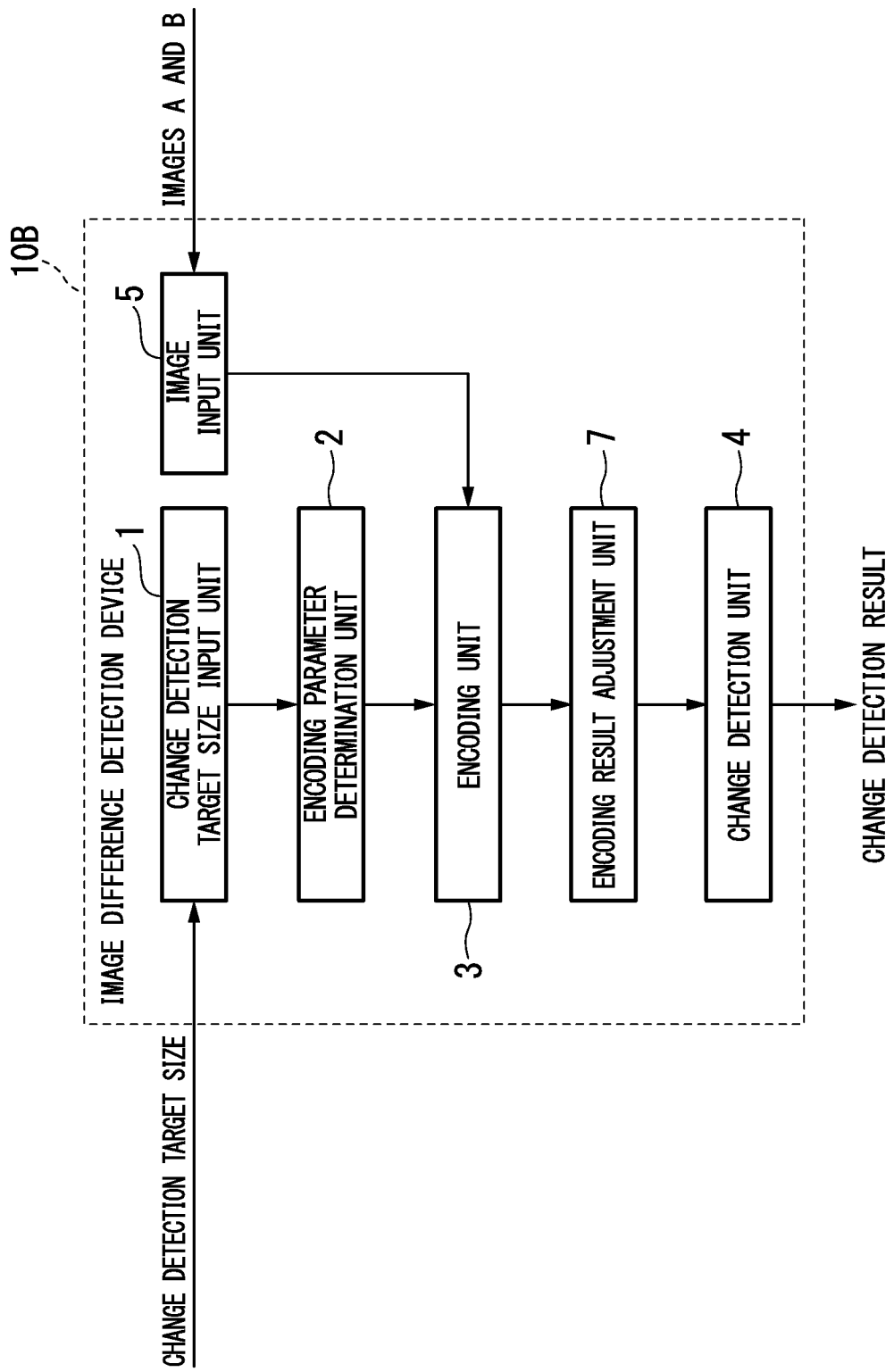
FIG. 5 is a block diagram showing a configuration of an image difference detection device according to a third embodiment of the present invention.
Figure 6:
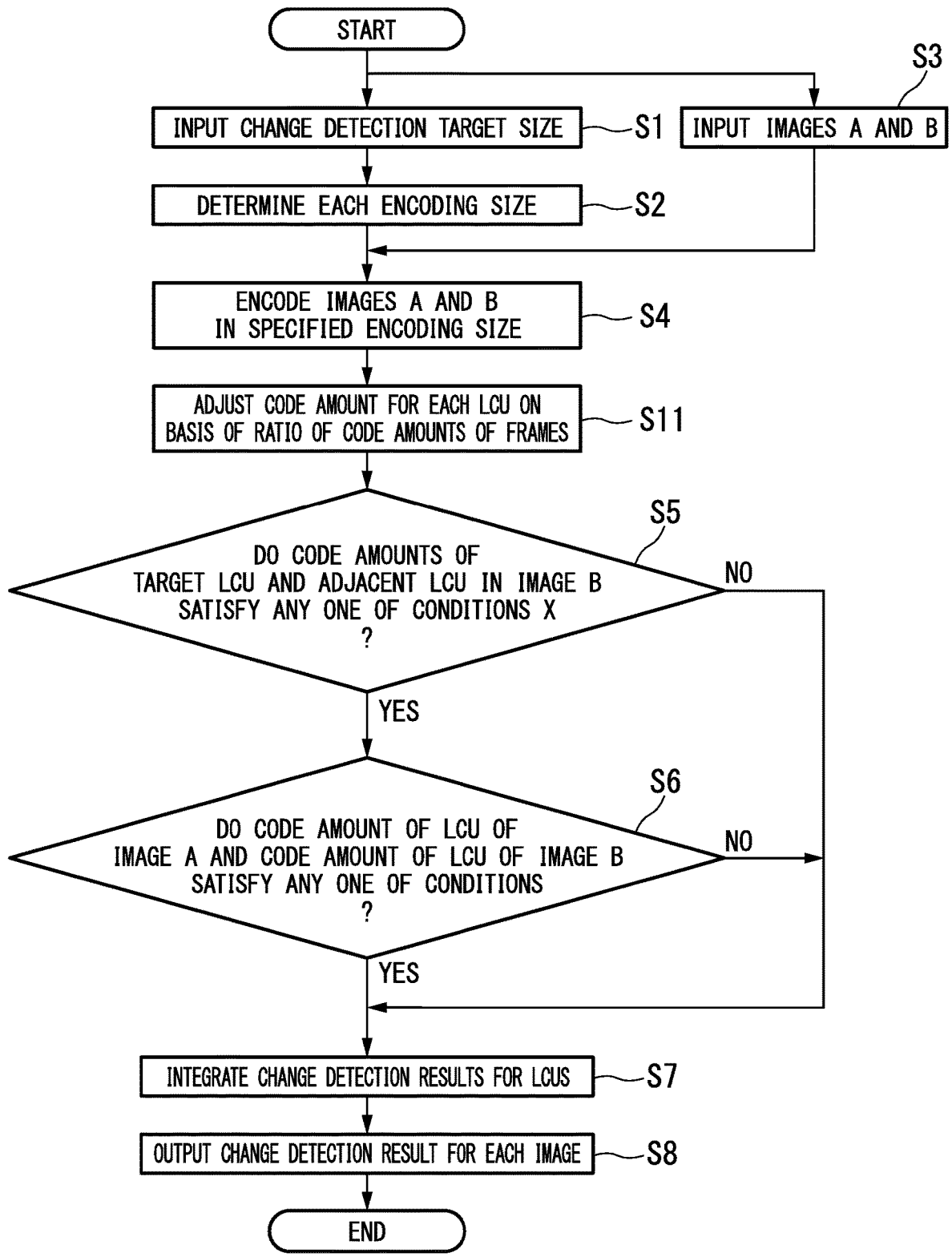
FIG. 6 is a flowchart showing a processing operation of the image difference detection device shown in FIG. 5.

Next, an image difference detection device according to a third embodiment will be described. FIG. 5 is a block diagram showing a configuration of an image difference detection device 10B according to the third embodiment. The same parts as those of the image difference detection device 10 shown in FIG. 1 are denoted by the same reference signs in FIG. 5 and description thereof will be omitted. The image difference detection device 10B shown in FIG. 5 is different from the image difference detection device 10 shown in FIG. 1 in that an encoding result adjustment unit 7 is newly provided. FIG. 6 is a flowchart showing a processing operation of the image difference detection device 10 shown in FIG. 5. The same parts as those of the processing operation shown in FIG. 2 are denoted by the same reference signs in FIG. 6 and description thereof will be omitted. The processing operation shown in FIG. 6 is different from the processing operation shown in FIG. 2 in that step S11 is provided.

The process of the third embodiment is similar to the process of the first embodiment, but the process of the third embodiment is different from the process of the first embodiment in that the encoding result adjustment unit 7 weights (adjusts) the code amount of each of the LCUs of the images A and B used in the change detection unit 4. Specifically, a process of the encoding result adjustment unit 7 is an added process, only a relevant part will be described.

If the characteristics of the image A and the characteristics of the image B (a sense of detail, color, and the like) are substantially the same, for example, when the images A and B are a video of general 30 fps or the like, the code amounts of the image A and the image B are not significantly different. However, if a photographing date and time and a photographing environment (a condition of sunlight when outdoors, an atmosphere state, or the like) are different, the code amount of the image A and the code amount of the image B are also significantly different in images captured by photographing the same portion or place. Even if change detection is performed from each LCU in these images, substantially all LCUs are detected to be changed and it is difficult to detect a true change. Therefore, if the code amounts in the images A and B are different, it is necessary to adjust the code amount of each LCU. The image difference detection device 10B according to the present embodiment adjusts the code amount.

The encoding unit 3 encodes the images A and B (step S4) and the encoding result adjustment unit 7 calculates code amounts r_A and r_B for each image. The encoding result adjustment unit 7 uses the code amounts r_A and r_B to adjust the code amount R_B of the LCU within the image B as follows (step S11).

$$R\_B' = (r\_A/r\_B) \times R\_B \times K$$

Here, R_B' denotes an adjusted code amount used by the change detection unit 4 in a process in a later part of a flow. Also, K is any given constant greater than 0. Also, K may be automatically adjusted in accordance with the entire image or the encoding information for each LCU. As in the operation shown in the first embodiment, the change detection unit 4 performs a change detection process using the code amount R_A and the adjusted code amount R_B'.

<Fourth Embodiment>

Figure 7:
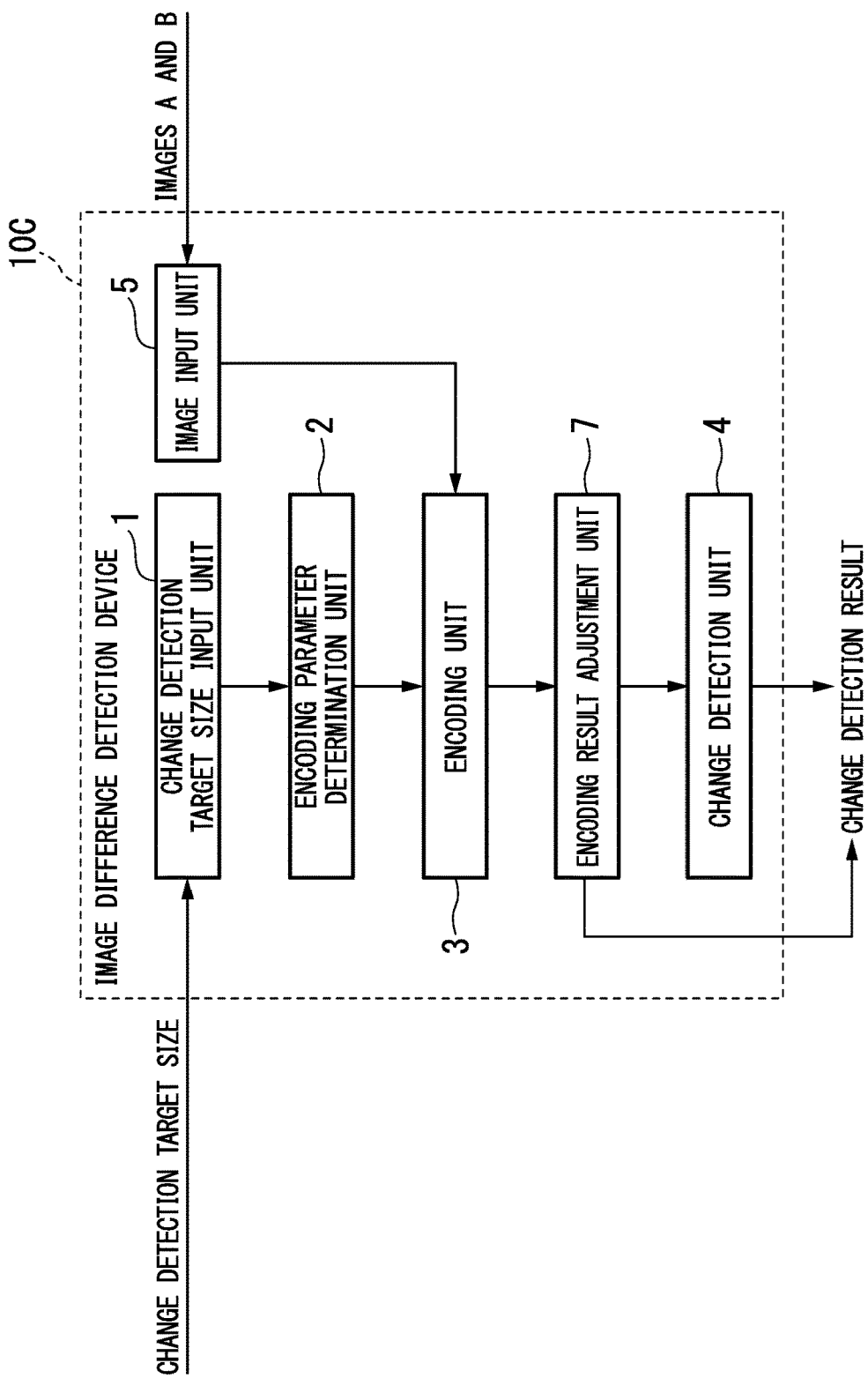
FIG. 7 is a block diagram showing a configuration of an image difference detection device according to a fourth embodiment of the present invention.

Next, an image difference detection device according to a fourth embodiment will be described. FIG. 7 is a block diagram showing a configuration of an image difference detection device 10C according to the fourth embodiment. The same parts as those of the image difference detection device 10B shown in FIG. 5 are denoted by the same reference signs in FIG. 7 and description thereof will be omitted. The image difference detection device 10C shown in FIG. 7 is different from the image difference detection device 10B shown in FIG. 5 in that a change detection result is output on the basis of an output of an encoding result adjustment unit 7.

The image difference detection device 10C according to the fourth embodiment outputs the output from the encoding result adjustment unit 7 as a change detection result without involving a change detection unit 4. For example, the encoding result adjustment unit 7 compares a code amount of an image A with a code amount of an image B. If the following (11) and (12) are satisfied, characteristics of the image A and characteristics of the image B are significantly different and it is detected that there is a change in all the LCUs, so that the encoding result adjustment unit 7 determines that there is a change in the entire image or that the change cannot be detected. The encoding result adjustment unit 7 outputs a determination result as an output result of the image difference detection device 10C without involving the change detection unit 4.

$$\max(r\_A/r\_B) > r\_Th1 \quad (11)$$

$$\min(r\_A/r\_B) < r\_Th2 \quad (12)$$

Here, r_Th1 is a threshold value that satisfies r_Th1>1 and r_Th2 is a threshold value that satisfies 0<r_Th2<1.

<Fifth Embodiment>

Figure 8:
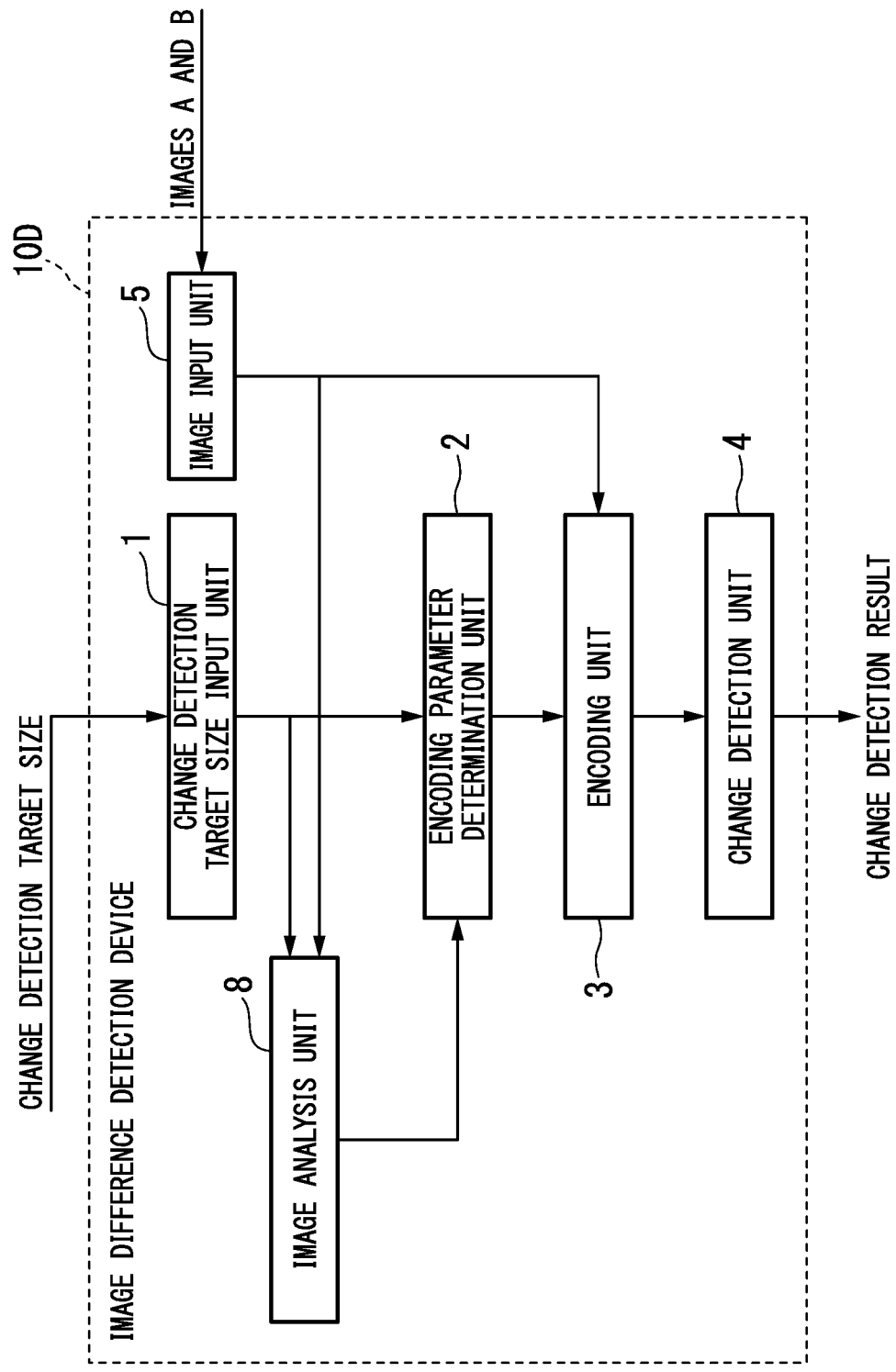
FIG. 8 is a block diagram showing a configuration of an image difference detection device according to a fifth embodiment of the present invention.
Figure 9:
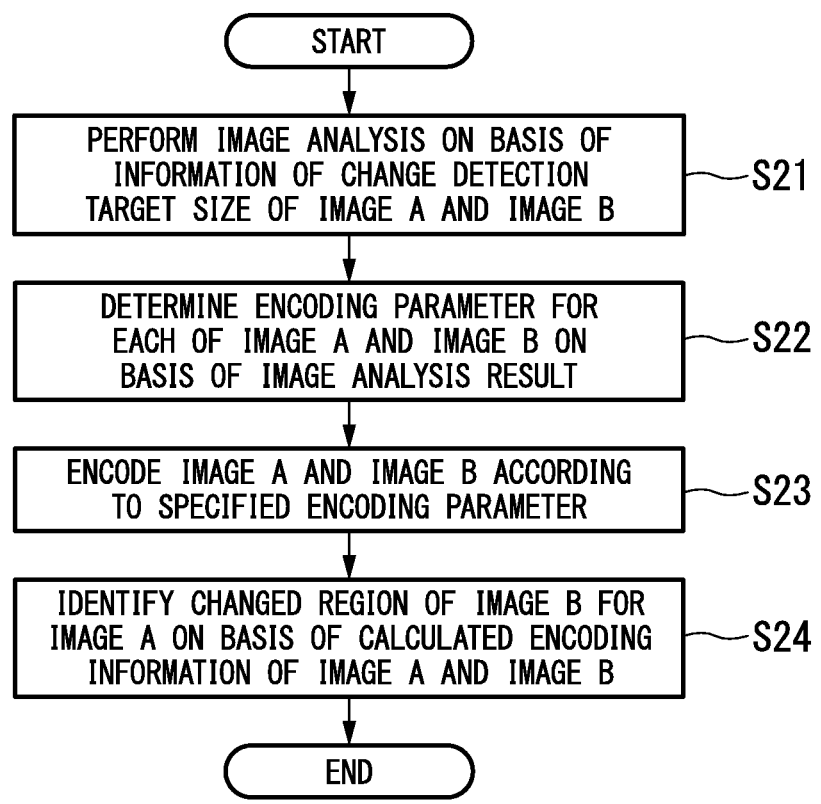
FIG. 9 is a flowchart showing a processing operation of the image difference detection device shown in FIG. 8.

Next, an image difference detection device according to a fifth embodiment will be described. FIG. 8 is a block diagram showing a configuration of an image difference detection device 10D according to the fifth embodiment. The same parts as those of the image difference detection device 10 shown in FIG. 1 are denoted by the same reference signs in FIG. 8 and description thereof will be omitted. The image difference detection device 10D shown in FIG. 8 is different from the image difference detection device 10 shown in FIG. 1 in that an image analysis unit 8 is newly provided. FIG. 9 is a flowchart showing a processing operation of the image difference detection device 10D shown in FIG. 8. Here, a processing operation in which the image difference detection device 10D detects a changed region (a spatial region with a difference) in the image B with respect to the image A will be described.

The processing operation of the image difference detection device 10D shown in FIG. 8 will be described. The image analysis unit 8 inputs the image A and the image B from the image input unit 5, inputs a desired change detection target size from the change detection target size input unit 1, and performs image analysis on each of the image A and the image B (step S21). The image analysis unit 8 identifies a block size to divide the images on the basis of the change detection object size and calculates a variance value (activity) of each color component in each of detected blocks obtained by dividing the image in the identified block size. Here, the activity is taken as an example, but an average value or a maximum value of each color component or the like can also be applied. Then, the image analysis unit 8 calculates a ratio (or a difference) of an average value of activities between detected blocks spatially corresponding to the image A and the image B, and outputs the calculated ratio to the encoding parameter determination unit 2.

The encoding parameter determination unit 2 determines the encoding size or the like according to the input change detection target size and also determines a pattern such as a quantization value to be applied to the image A and the image B on the basis of the activity ratio output from the image analysis unit 8. If H.264/AVC or HEVC is used in encoding of a subsequent stage, the encoding parameter determination unit 2 may determine a pattern of a quantization matrix.

Also, the encoding parameter determination unit 2 may determine the quantization parameter value or the quantization matrix for each color component on the basis of a result of analyzing each color component. For example, when the activity of each color component of the detected block n (n=0, 1, ..., N) is $a_A(n)$ or $a_B(n)$, a ratio ar between average values of activities in the images is $$ar = \Sigma a_A(n) / \Sigma\Sigma a_B(n).$$

Here, the encoding parameter determination unit 2 determines quantization parameters $QP_A$ and $QP_B$ to be applied to the image A and the image B on the basis of a value of the ratio ar (step S22). A predetermined reference quantization parameter is applied to either one of the image A and the image B as it is and a quantization parameter converted using a quantization parameter difference e calculated from ar is applied to the other.

For example, if the reference quantization parameter is denoted by $QP_A$, the transformed quantization parameter $QP_B$ is $$QP_B = QP_A - e, \text{ where } e = f(ar).$$

The function f is a function of converting the activity ratio into a quantization parameter difference. The function f is a functional form having a tendency to increase the quantization parameter difference e when the activity ratio ar is large.

Next, the encoding unit 3 encodes the image A and the image B by using the quantization value or the like determined by the encoding parameter determination unit 2, and outputs a code amount for each encoded block of the encoding size described above (step S23). Means for encoding any moving image or still image such as MPEG2 or JPEG as well as the above-described H.264/AVC or HEVC can be applied to an encoding means.

The change detection unit 4 compares code amounts of encoded blocks and outputs information indicating whether or not each detected block is a changed region through a comparison with a predetermined threshold value or the like (step S24). The information output by the change detection unit 4 may be not only the two determinations of whether or not the detected block is a changed region, but also more than two determination results to which a determination that determination is impossible is added.

As described above, the image difference detection device 10D according to the present embodiment determines a quantization parameter to be applied when each image is encoded on the basis of a ratio or a difference between activities. Thereby, it is possible to minimize an erroneous determination of change detection due to an influence of a photographing environment or a photographing date and time.

That is, even in images obtained by photographing the same place, the code amount output as an encoding result is significantly different due to the influence of the photographing environment or the photographing date and time. For example, the overall color tone of the image differs between sunny times and cloudy times. Thus, when the code amounts are compared as they are, an erroneous determination of change detection occurs due to the influence of the photographing environment or the photographing date and time. The image difference detection device 10D according to the present embodiment calculates a variance value of each color component within the detected block as an activity and determines a quantization parameter on the basis of a ratio or a difference between activities. The quantization parameter is a main element for determining the code amount. By correcting the quantization parameter on the basis of the ratio or the difference between the activities, the image difference detection device 10D can minimize an erroneous determination of change detection.

<Sixth Embodiment>

Figure 10:
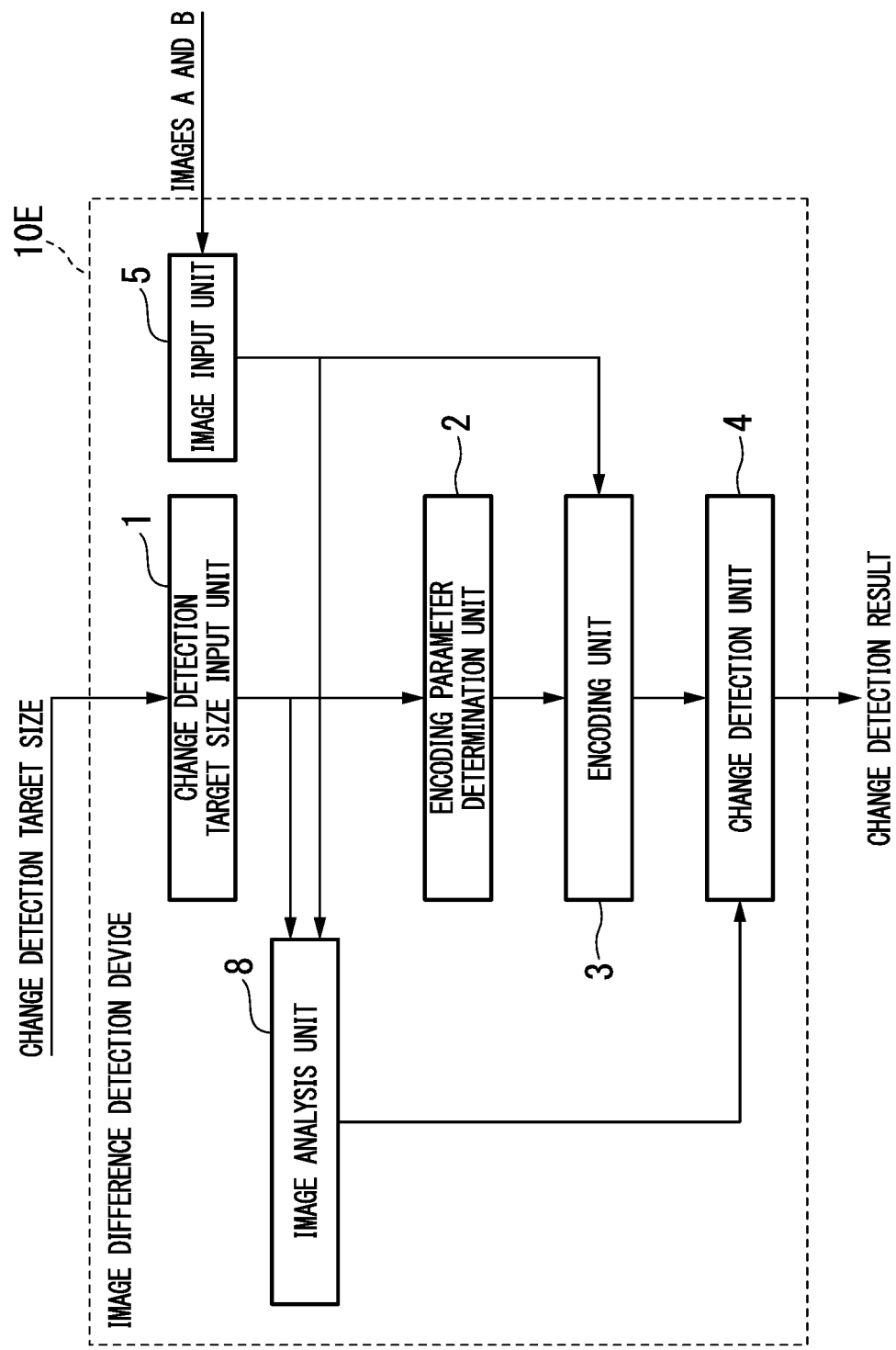
FIG. 10 is a block diagram showing a configuration of an image difference detection device according to a sixth embodiment of the present invention.
Figure 11:
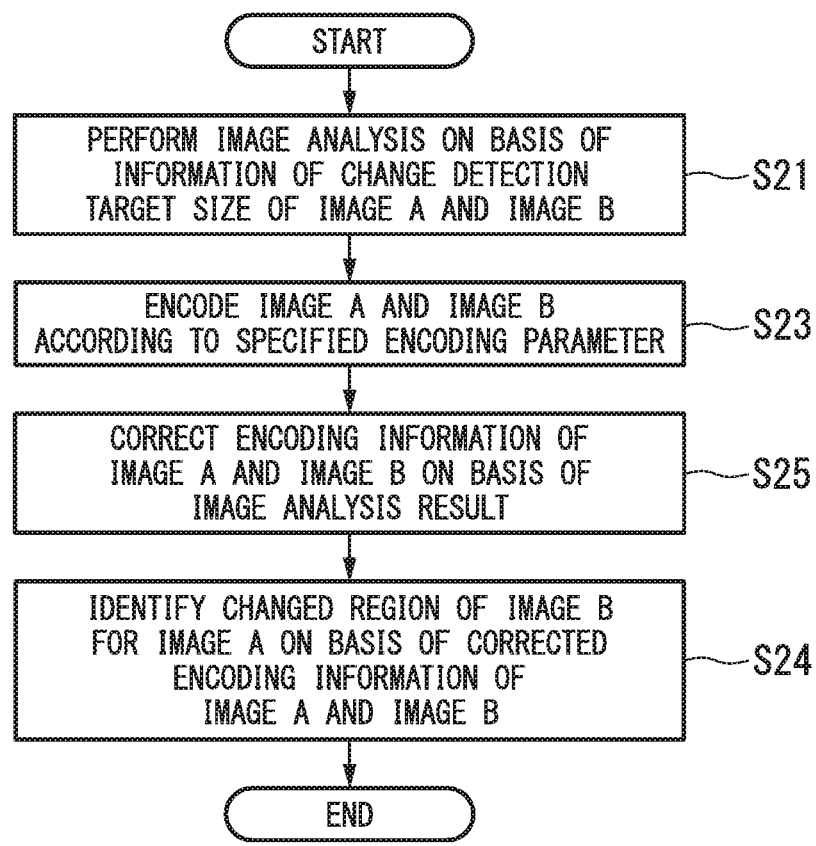
FIG. 11 is a flowchart showing a processing operation of the image difference detection device shown in FIG. 10.

Next, an image difference detection device according to a sixth embodiment will be described. FIG. 10 is a block diagram showing a configuration of an image difference detection device 10E according to the sixth embodiment. The same parts as those of the image difference detection device 10D shown in FIG. 8 are denoted by the same reference signs in FIG. 10 and description thereof will be omitted. The image difference detection device 10E shown in FIG. 10 is different from the image difference detection device 10D shown in FIG. 8 in that an output of an image analysis unit 8 is input to a change detection unit 4. FIG. 11 is a flowchart showing a processing operation of the image difference detection device 10E shown in FIG. 10. The image difference detection device 10D according to the fifth embodiment uses image analysis information output from the image analysis unit 8 to determine an encoding parameter. The image difference detection device 10E according to the sixth embodiment uses image analysis information when a changed region is detected using encoding information.

In the image difference detection device 10E of the present embodiment, the change detection unit 4 inputs an activity ratio for each of detected blocks of the image A and the image B output from the image analysis unit 8, and corrects the encoding information of each of the image A and the image B. Specifically, the change detection unit 4 scales the code amount on the basis of information of the activity ratio with respect to code amount information for each of detected blocks of the image A and the image B. The change detection unit 4 performs a comparison with a predetermined threshold value by using the scaled code amount value, determines whether or not each detected block is a changed region, and outputs a determination result. Calculation of scaling on the code amount of the detected block may be performed using only the activity ratio of the corresponding detected block or may be performed in consideration of the activity ratio of a specified surrounding region.

For example, it is assumed that the encoding unit 3 encodes the images A and B and calculates code amounts $r_A$ and $r_B$ of the images. As in the image difference detection device 10D of the fifth embodiment, if the image analysis unit 8 obtains the activity ratio ar, the change detection unit 4 uses the activity ratio ar to adjust the code amount $R_B$ for each detected block in the image B as follows.

$$R_{B'} = R_B \times K, \text{ where } K = g(ar)$$

Here, the function g is a function of converting the activity ratio to a scaling coefficient of the code amount. The function g is a functional form having a tendency to increase K if the activity ratio ar is large.

This processing operation will be described with reference to FIG. 11. First, the image analysis unit 8 performs image analysis on the images A and B on the basis of information of change detection target sizes of the images A and B (step S21). Subsequently, the encoding unit 3 encodes the image A and the image B with specified encoding parameters (step S23).

Next, the change detection unit 4 corrects encoding information of the image A and the image B on the basis of an image analysis result (step S25). Then, the change detection unit 4 identifies a changed region of the image B with respect to the image A on the basis of encoding information of the image A and the image B after the correction (step S24).

As described above, in the present embodiment, the code amount of each image is adjusted on the basis of the ratio or the difference between the activities. Thereby, it is possible to minimize an erroneous determination of change detection due to the influence of a photographing environment or a photographing date and time.

That is, even in images captured in the same place, the code amount output as an encoding result is significantly different due to the influence of the photographing environment or the photographing date and time. For example, the overall color tone of the image differs between sunny times and cloudy times. Thus, when the code amounts are compared as they are, an erroneous determination of change detection occurs due to the influence of the photographing environment or the photographing date and time. The image difference detection device 10E according to the present embodiment calculates a variance value of each color component in the detected block as an activity and adjusts the code amount through scaling based on the ratio or the difference between the activities. Thereby, the image difference detection device 10E can minimize an erroneous determination of change detection due to an influence of the photographing environment or the photographing date and time.

<Seventh Embodiment>

Figure 12:
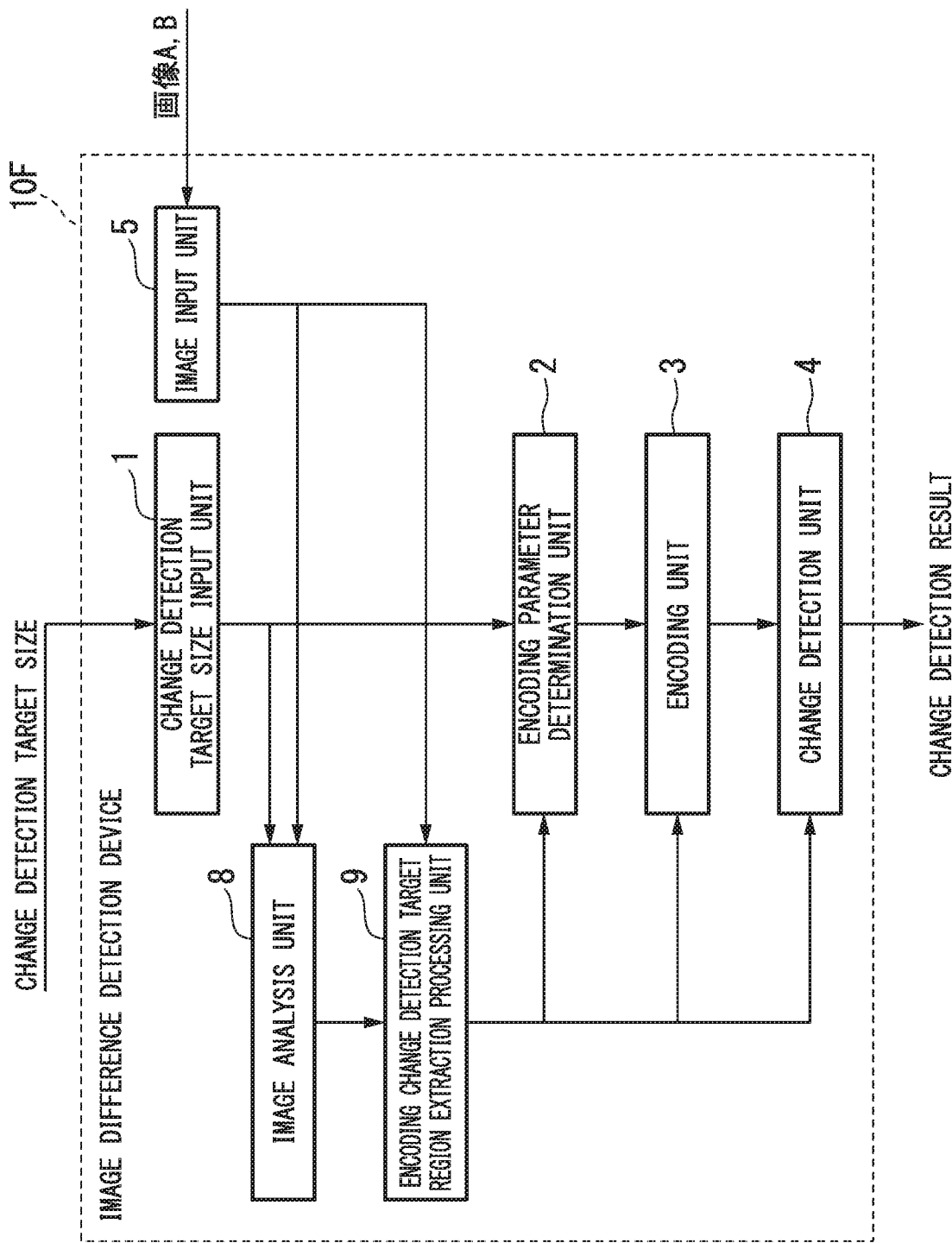
FIG. 12 is a block diagram showing a configuration of an image difference detection device according to a seventh embodiment of the present invention.
Figure 13:
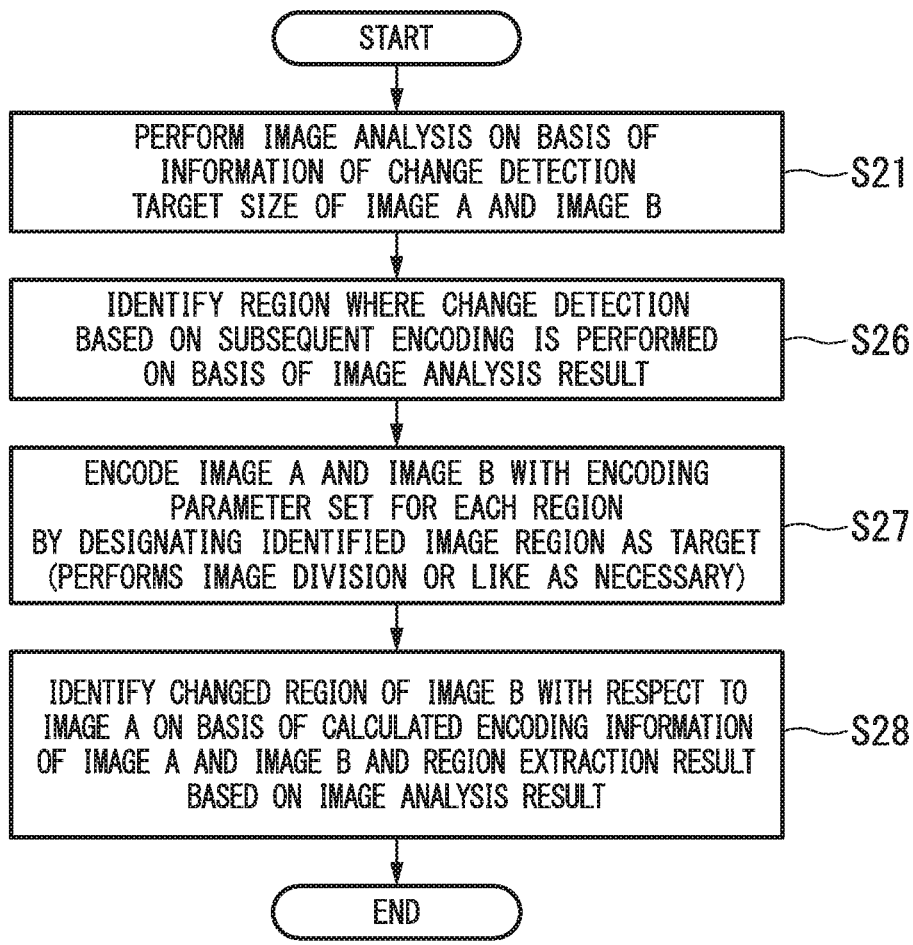
FIG. 13 is a flowchart showing a processing operation of the image difference detection device shown in FIG. 12.

Next, an image difference detection device according to a seventh embodiment will be described. FIG. 12 is a block diagram showing a configuration of the image difference detection device 10F according to the seventh embodiment. The same parts as those of the image difference detection device 10D shown in FIG. 8 are denoted by the same reference signs in FIG. 12 and description thereof will be omitted. The image difference detection device 10F shown in FIG. 12 is different from the image difference detection device 10D shown in FIG. 8 in that an encoding change detection target region extraction processing unit 9 is provided. FIG. 13 is a flowchart showing a processing operation of the image difference detection device 10 shown in FIG. 12. The image difference detection device 10D according to the fifth embodiment uses image analysis information output from an image analysis unit 8 to determine encoding parameters. Before a series of processes (a change point extraction process) is performed by an encoding parameter determination unit 2, an encoding unit 3, and a change detection unit 4, the image difference detection device 10F according to the present embodiment uses the image analysis information to identify an image region serving as a target of the process using the encoding change detection target region extraction processing unit 9.

The encoding change detection target region extraction processing unit 9 inputs an activity ratio of each of detected blocks of the image A and the image B output from the image analysis unit 8 and sets a detected block whose activity ratio is larger than a predetermined threshold value as a non-target block of a change point extraction process based on encoding of a subsequent stage. As a method of setting a detected block as a non-target block, (1) a method of clipping or dividing an image to omit a detected non-target block, (2) a method of painting a detected non-target block in a specified color, (3) a method of reflecting an encoding parameter to be applied only to a detected non-target bock and a threshold value for change detection so that a region is necessarily determined to be a changed region by the change detection unit of the subsequent stage without changing an image, and the like can be used.

In the case of (1), a change point extraction process based on encoding is performed for each divided or clipped image. If the detected block size is small, a large number of fine images are generated through clipping or dividing. If there is a certain area or more where a region determined not to be a target is present, a region which is not a non-target region may be also regarded to be a non-target region and it is possible to reduce the number of divisions and the like.

In the case of (2), the change point extraction process based on encoding as in the fifth embodiment is performed.

In the case of (3), the encoding parameter determination unit 2 sets the threshold value for the code amount difference to 0 or a very small value only in the non-target region.

This processing operation will be described with reference to FIG. 13. First, the image analysis unit 8 performs image analysis on the basis of information of the change detection target size for the images A and B (step S21). Subsequently, the encoding change detection target region extraction processing unit 9 identifies a region where change detection based on subsequent encoding is performed on the basis of an image analysis result (step S26).

Next, the encoding unit 3 encodes, for the identified image regions as target, the image A and the image B with an encoding parameter set for each region (performs image division or the like as necessary) (step S27). Then, the change detection unit 4 identifies a changed region of the image B with respect to the image A on the basis of calculated encoding information of the image A and the image B and a region extraction result based on an image analysis result (step S28).

As described above, the image difference detection device 10F of the present embodiment determines a region serving as a target of the change point extraction process on the basis of a ratio or a difference between activities. Thereby, the image difference detection device 10F can minimize an erroneous determination of change detection due to the influence of the photographing environment or the photographing date and time.

That is, even in images captured in the same place, the code amount output as an encoding result is significantly different due to the influence of the photographing environment or the photographing date and time. For example, the overall color tone of the image differs between sunny times and cloudy times. Furthermore, when a region is covered with many clouds, a difference in a code amount becomes large. Therefore, the image difference detection device 10F according to the present embodiment determines a region serving as a target of the change point extraction process on the basis of the ratio or the difference between the activities. Thereby, images whose code amounts significantly change even if the same region is photographed such as a cloudy image and a cloudless image can be excluded from change detection targets. Thereby, the image difference detection device 10F can minimize an erroneous determination of change detection due to the influence of the photographing environment or the photographing date and time.

<Eighth Embodiment>

Figure 14:
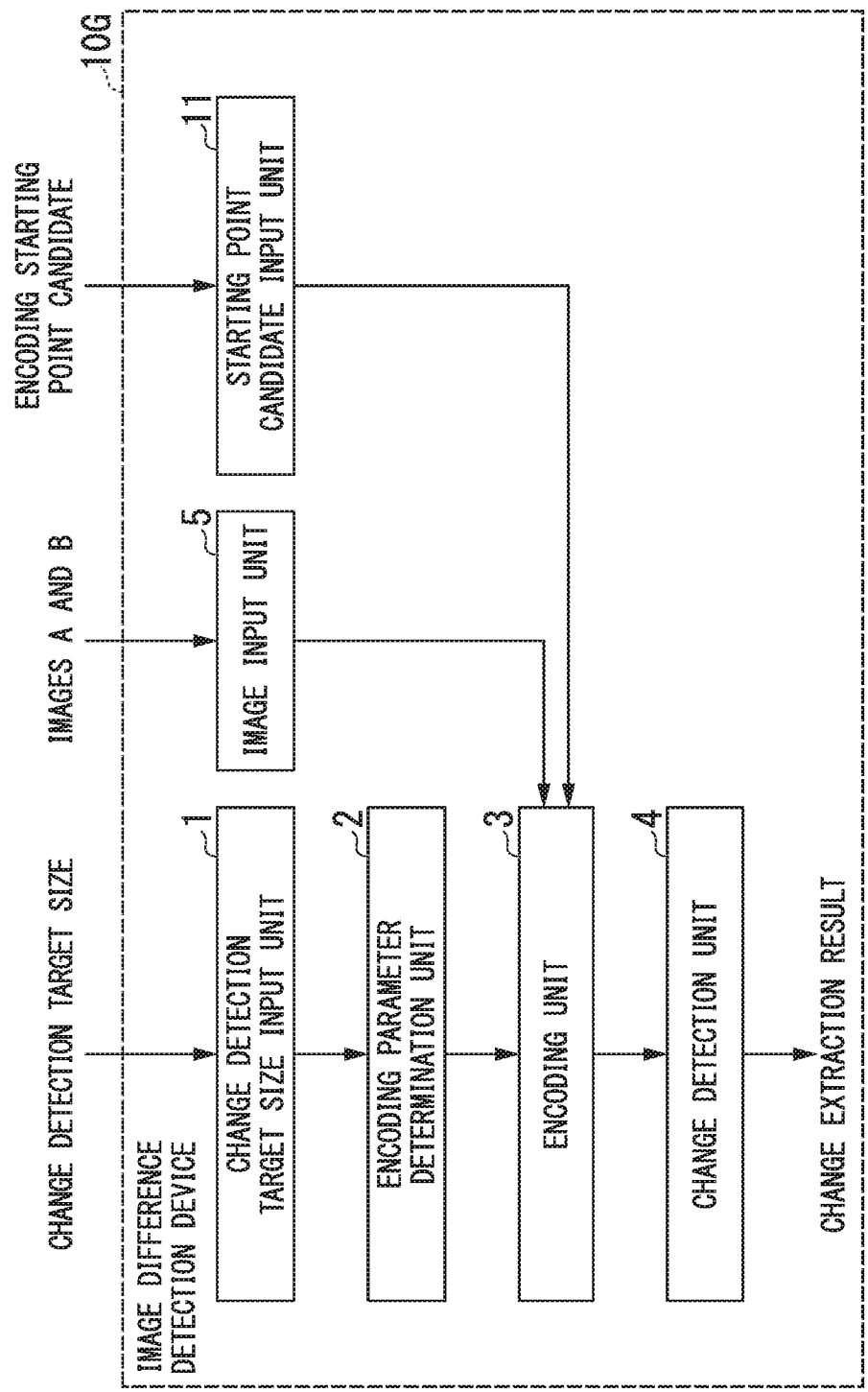
FIG. 14 is a block diagram showing a configuration of an image difference detection device according to an eighth embodiment of the present invention.
Figure 15:
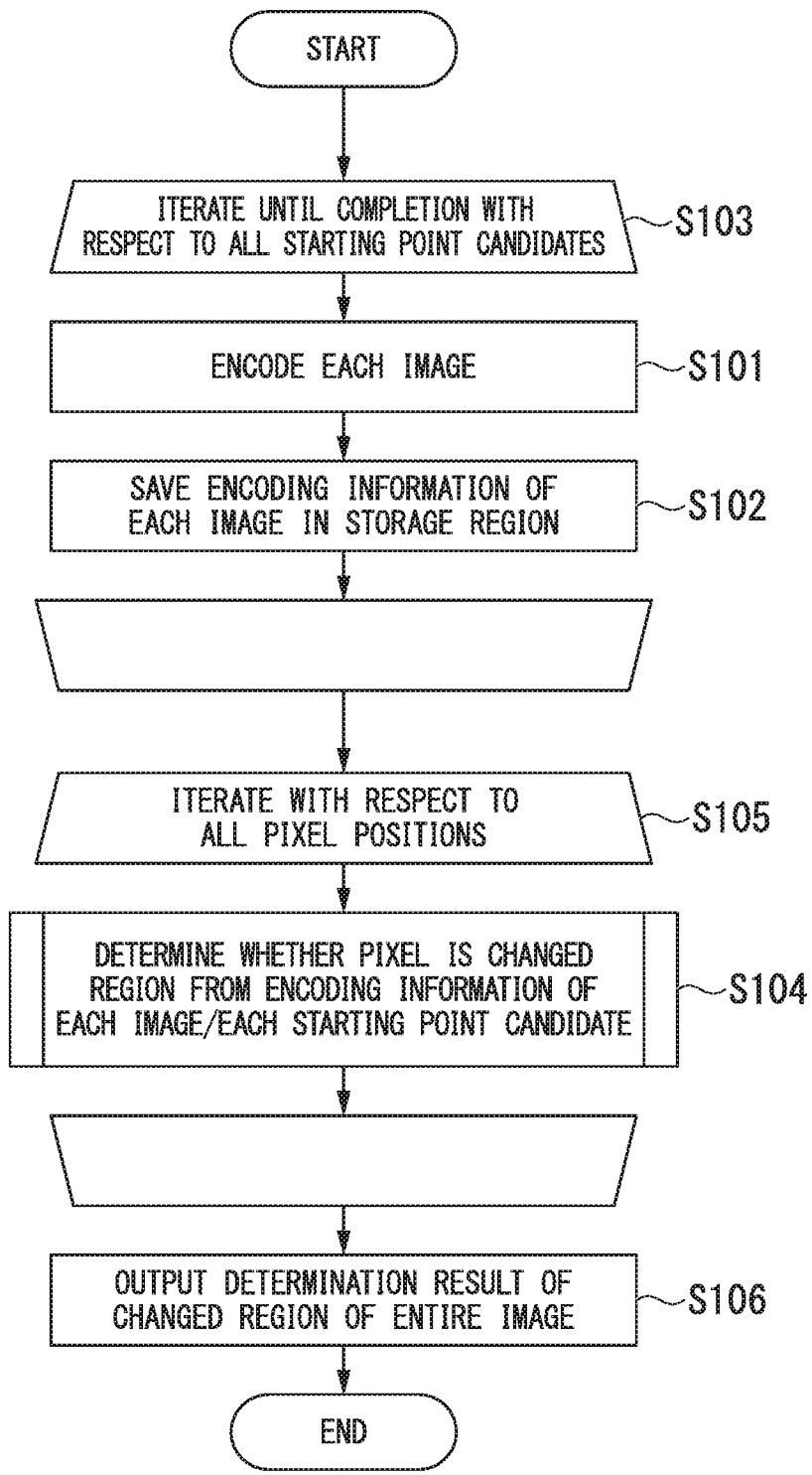
FIG. 15 is a flowchart showing a processing operation of the image difference detection device shown in FIG. 14.

Next, an image difference detection device according to an eighth embodiment will be described. FIG. 14 is a block diagram showing a configuration of an image difference detection device 10G according to the eighth embodiment. The same parts as those of the image difference detection device 10 shown in FIG. 1 are denoted by the same reference signs in FIG. 14 and description thereof will be omitted. The image difference detection device 10G shown in FIG. 14 is different from the image difference detection device 10 shown in FIG. 1 in that a starting point candidate input unit 11 is newly provided. FIG. 15 is a flowchart showing a processing operation of the image difference detection device 10G shown in FIG. 14.

In the image difference detection device 10G according to the present embodiment, when a changed region is identified, the encoding unit 3 encodes an image A and an image B at different starting points and executes an encoding process on each image twice or more. A starting point candidate is input to the starting point candidate input unit 11. The change detection unit 4 identifies a changed region by combining results of a plurality of encoding processes. As in HEVC, H.264, MPEG2, MPEG JPEG or the like as an encoding scheme, one screen is divided into a plurality of blocks, predictive encoding is performed according to intra- or inter-prediction in units of blocks and orthogonal codes, and an encoding scheme of performing compressed encoding on encoded data of each block according to a variable length code is used. The encoding unit 3 performs encoding for at least each block.

As an example, the number of pixels of half a block size serving as a unit of encoding in vertical and horizontal directions can be applied as a shift width for differentiating a starting point. For example, if an 8×8 block is assumed to be a unit of encoding, a position (0, 0) becomes a starting point when the starting point is not shifted and a position (4, 4) becomes a starting point when half the block size in the vertical and horizontal directions is shifted. In this case, the starting point (0, 0) and the starting point (4, 4) are input as the starting point candidate to the starting point candidate input unit 11. Then, the encoding unit 3 performs encoding in two patterns from the starting point (0, 0) and the starting point (4, 4). Then, the change detection unit 4 identifies a changed region by combining an encoding processing result when encoding is performed from the starting point (0, 0) and an encoding processing result when encoding is performed from the starting point (4, 4).

Next, the processing operation of the image difference detection device 10G shown in FIG. 14 will be described with reference to the flowchart of FIG. 15. First, the starting point candidate input unit 11 pre-inputs two or more candidates for encoding starting points (uppermost left pixel positions) of the images A and B and sets the two or more candidate starting points.

The encoding unit 3 encodes the image A and the image B with respect to all the set candidate starting points as starting points (step S101) and saves encoding information (a code amount or the like) obtained through encoding in a storage region (step S102). For example, two starting point candidates of (0, 0) and (4, 4) are assumed. In the former case, the encoding unit 3 starts encoding from a pixel position at the top left of the image. In the latter case, the encoding unit 3 starts encoding from a position shifted by 4 pixels vertically and horizontally in a lower right direction from the pixel position at the top left of the image. Thereby, the boundary of the encoded block is shifted by four pixels at a time. The encoding unit 3 iterates a process on all candidates for the starting point until the encoding process is completed (step S103).

When the encoding unit 3 encodes the image A and the image B with all the candidates for the starting point in the processing of steps S101 to S103, the change detection unit 4 subsequently determines whether or not the image has a changed region on the basis of encoding information of the starting point candidate of each image (step S104). The change detection unit 4 iterates a process of determining whether or not there is a changed region with respect to all pixel positions (step S105).

Finally, when the changed region is detected through the processing of steps S104 and S105, the change detection unit 4 outputs a changed region determination result for the entire image (step S106).

Here, in step S104 in FIG. 15, the change detection unit 4 identifies encoding information of the encoded block in each starting point candidate to which a pixel belongs with respect to each of pixel positions of the image A and the image B and determines whether or not there is a change in the pixel according to difference calculation of the encoding information or the like. Details of this processing will be described with reference to the flowcharts of FIGS. 16 and 17.

Figure 16:
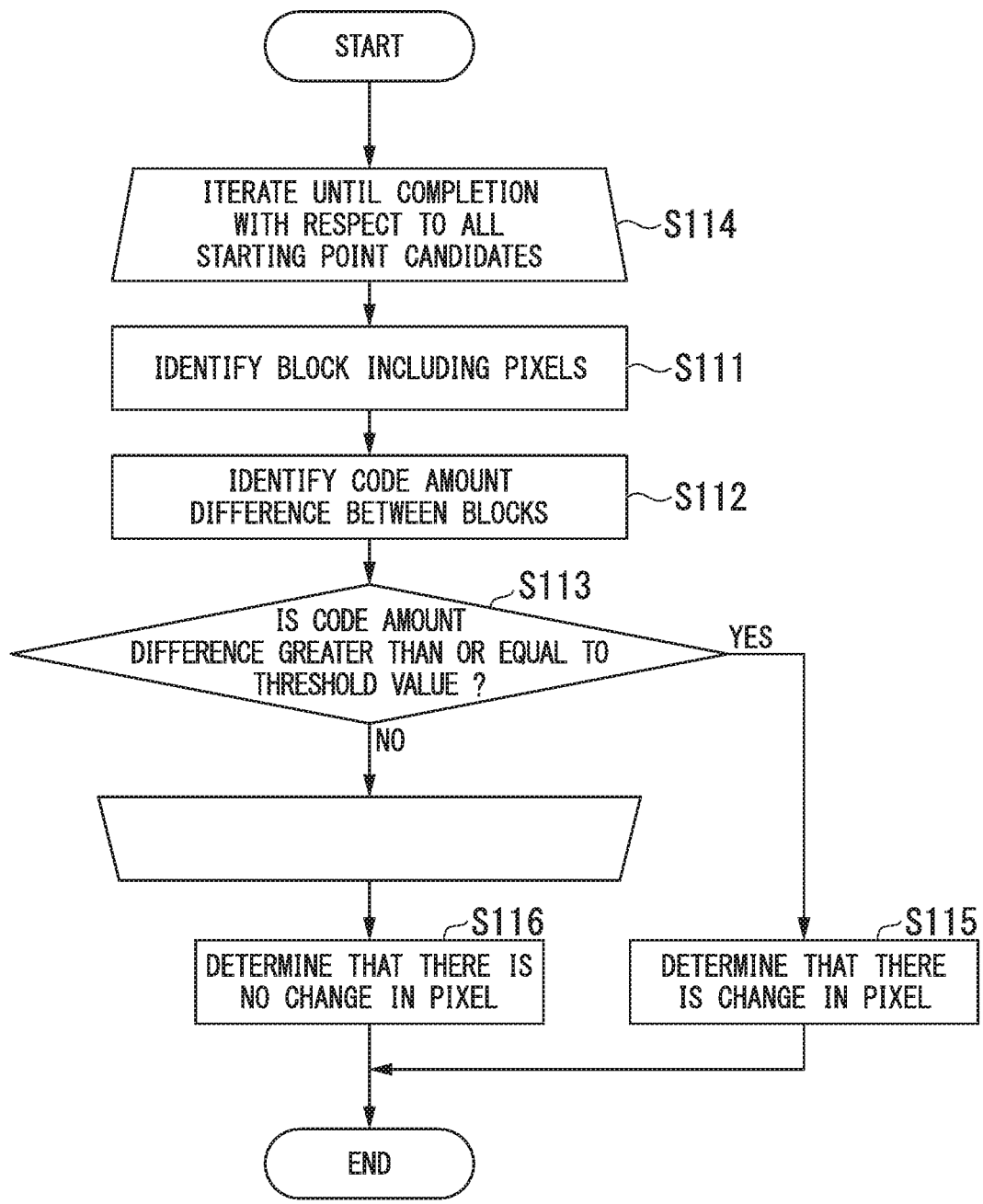
FIG. 16 is a flowchart showing an example of a process of determining whether or not a region is a changed region in the operation process shown in FIG. 14.

FIG. 16 is a flowchart showing an example of a process of determining whether or not a region is a changed region in step S104. Here, a process of determining whether or not there is a change in a pixel x will be described.

First, the change detection unit 4 identifies an encoded block including the pixel x among encoded blocks obtained through encoding using a starting point candidate n in the image A and the image B (step S111) and identifies a difference in encoding information possessed by the identified encoded block (step S112). Here, a code amount R is taken as an example of the encoding information, a code amount of the image A is denoted by RA(n, x), and a code amount of the image B is denoted by RB(n, x). The change detection unit 4 compares a difference between the code amount RA(n, x) and the code amount RB(n, x) with a threshold value rTH to determine whether the code amount difference is larger than or equal to the threshold value rTH (step S113). That is, the change detection unit 4 compares the code amount difference with the threshold value rTH, and determines whether or not the following conditional expression is satisfied for all the candidate starting points (step S114).

$|RA(n, x) - RB(n, x)| \geq rTH$

However, in the example of the process shown in FIG. 16, when the above expression is satisfied for any one of starting point candidates (step S113: Yes), the change detection unit 4 stops determining the remaining starting point candidates and outputs a determination result indicating that there is a change in a pixel (step S115). If the above expression is not satisfied for all the starting point candidates (step 113: No), the change detection unit 4 outputs the determination result indicating that there is no change in a pixel (step S116).

Figure 17:
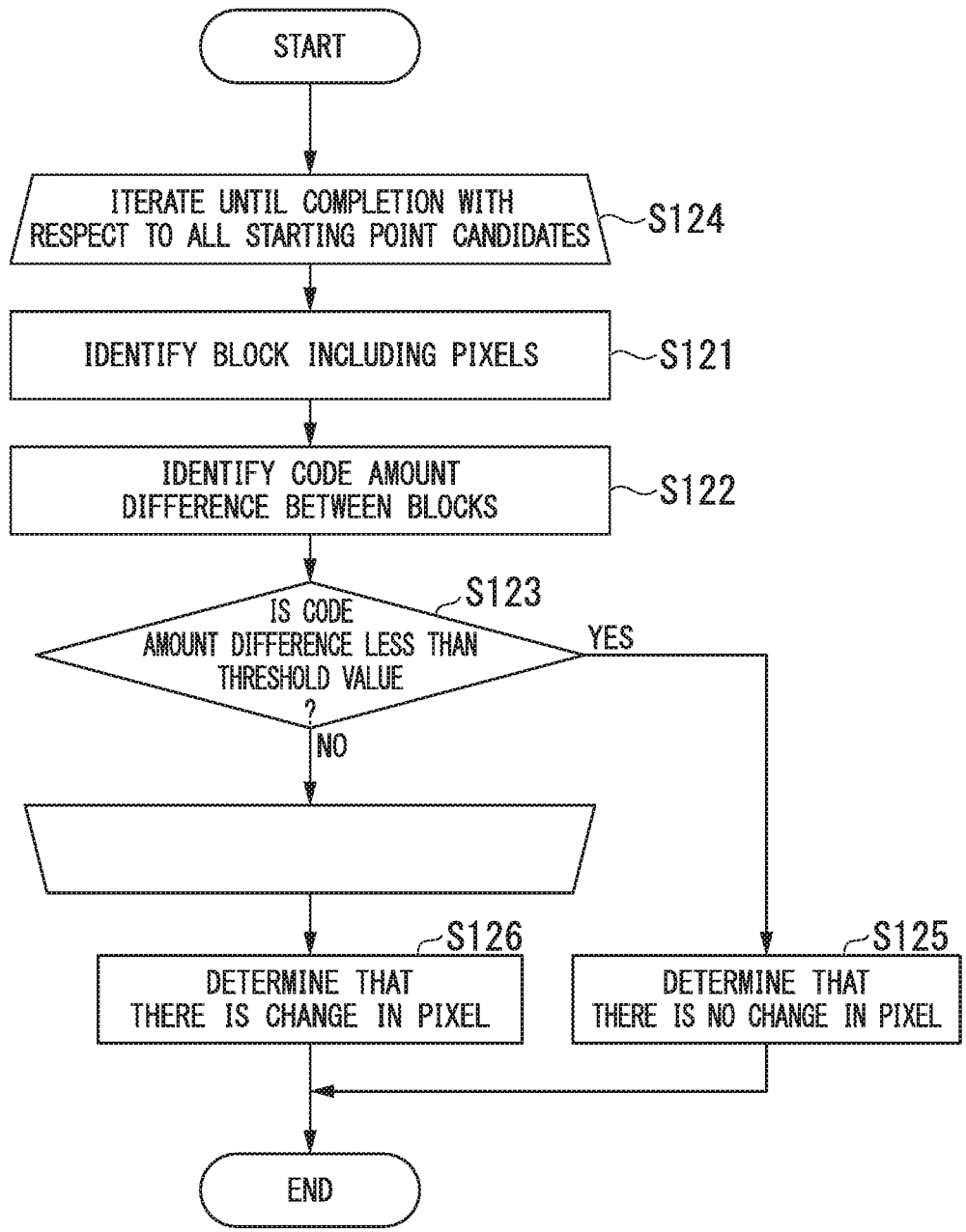
FIG. 17 is a flowchart showing another example of a process of determining whether or not a region is a changed region in the operation process shown in FIG. 14.

FIG. 17 is a flowchart showing another example of the process of determining whether or not a region is a changed region in step S104. Here, a process of determining whether or not there is a change in a pixel x will be described.

The processing of steps S121 and S122 is the same as the processing of steps S111 and S112 shown in FIG. 16. In this example, in step S123, the change detection unit 4 compares the code amount difference of the identified encoded block with the threshold value rTH and determines whether or not the code amount difference is less than the threshold value rTH. That is, the change detection unit 4 compares the code amount difference with the threshold value rTH and determines whether or not the following conditional expression is satisfied for all the candidate starting points.

$|RA(n, x) - RB(n, x)| < rTH$

However, in the example of the process shown in FIG. 17, if the above expression is satisfied for any one of starting point candidates (step S123: Yes), the change detection unit 4 stops determining the remaining starting point candidates, and outputs a determination result that there is no change in a pixel (step S125). If the above equation is not satisfied for all the candidate starting points (step S123: No), the change detection unit 4 outputs a determination result indicating that there is a change in a pixel (step S126).

<Ninth Embodiment>

Figure 18:
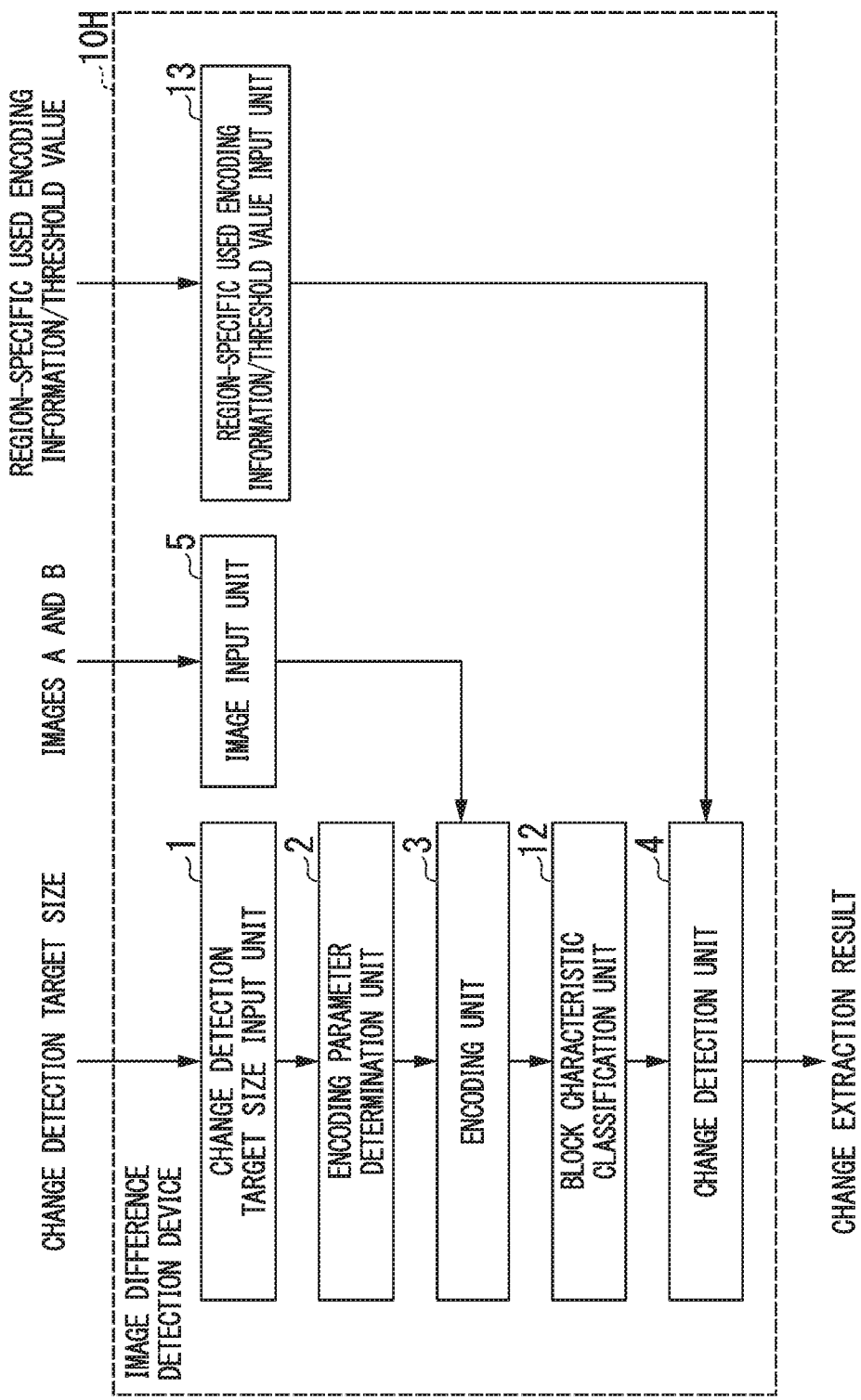
FIG. 18 is a block diagram showing a configuration of an image difference detection device according to a ninth embodiment of the present invention.
Figure 19:
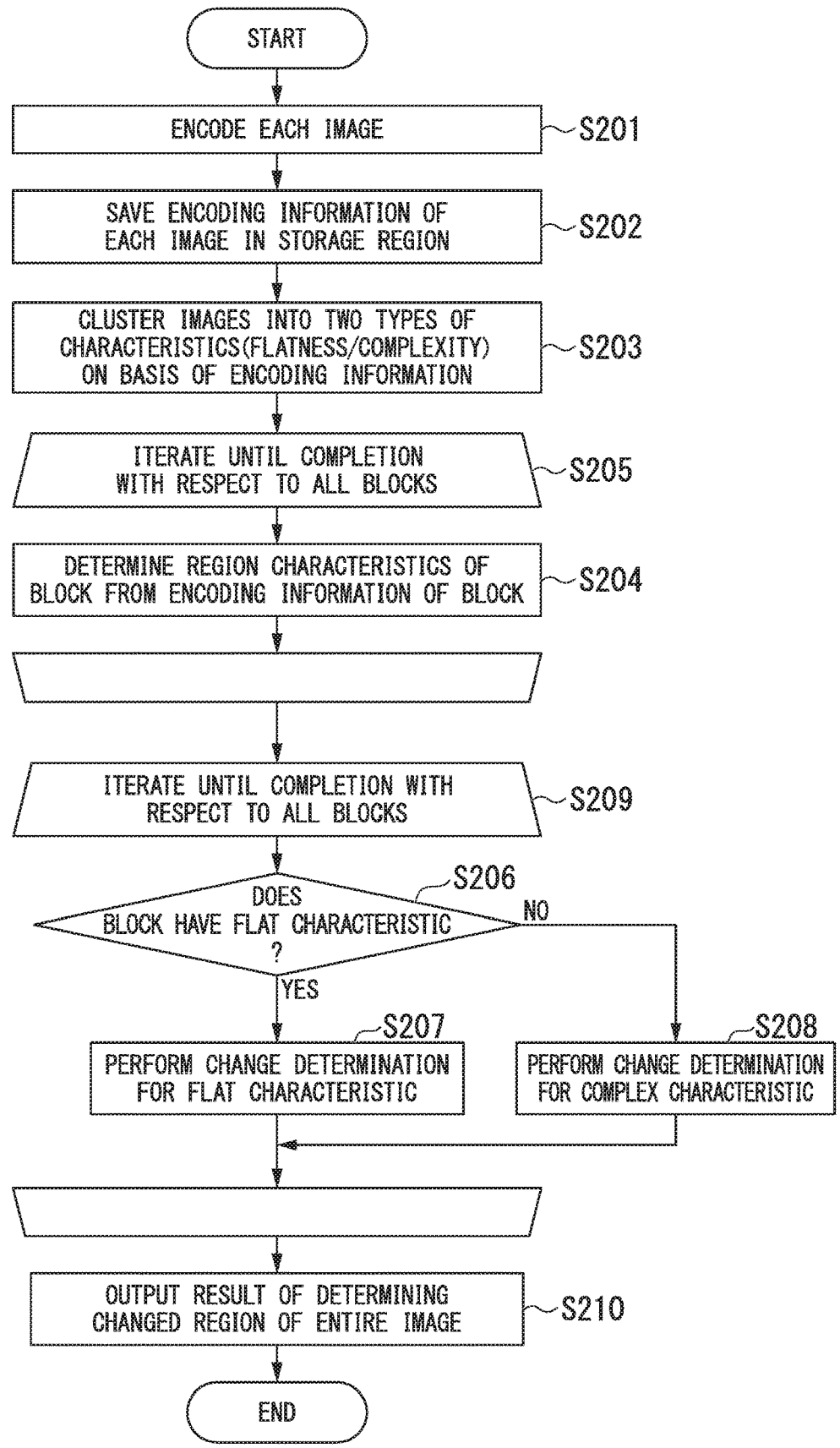
FIG. 19 is a flowchart showing a processing operation of the image difference detection device shown in FIG. 18.

Next, an image difference detection device according to a ninth embodiment will be described. FIG. 18 is a block diagram showing a configuration of an image difference detection device 10H according to the ninth embodiment. The same parts as those of the image difference detection device 10 shown in FIG. 1 are denoted by the same reference signs in FIG. 18 and description thereof will be omitted. The image difference detection device 10H shown in FIG. 18 is different from the image difference detection device 10 shown in FIG. 1 in that a block characteristic classification unit 12 and a region-specific used encoding information/threshold value input unit 13 are newly provided. FIG. 19 is a flowchart showing a processing operation of the image difference detection device 10H shown in FIG. 18.

The block characteristic classification unit 12 in FIG. 18 classifies the characteristics of each encoded block into categories such as a flat region and a complex region. For example, the change detection unit 4 detects a change by using only an absolute value of the code amount in the flat region and the change is detected by using an absolute value of the code amount and a variance value of the code amount in the complex region. As described above, the block characteristic classification unit 12 sets a constraint condition according to the category, and changes encoding information and a determination criterion used for change detection. Also, at this time, the block characteristic classification unit 12 changes a threshold value according to a category such as a flat region or a complex region. Also, in each of the classified categories, a step corresponding to a degree thereof may be set. For example, with respect to the flat region, a category is set with a larger suffix every time the degree of flatness increases as in flatness 1, flatness 2, . . . .

Next, the processing operation of the image difference detection device 10H shown in FIG. 18 will be described with reference to the flowchart of FIG. 19. First, the encoding unit 3 encodes an image A and an image B (step S201), and stores the encoding information of each image in the storage region (step S202). As in HEVC, H.264,MPEG2, MPEG JPEG or the like as an encoding scheme, one screen is divided into a plurality of encoded blocks, predictive encoding is performed according to intra- or inter-prediction in units of encoded blocks and orthogonal codes, and an encoding scheme of performing compressed encoding on encoded data of each encoded block according to a variable length code is used. The encoding unit 3 performs encoding for at least each encoded block.

Next, by using the encoding information, the block characteristic classification unit 12 classifies encoded blocks in the image A and the image B into categories corresponding to the region characteristics. Here, an example of a code amount is taken as the encoding information and a case in which encoded blocks are classified into two categories such as a flat region and a complex region by using the code amount will be described.

First, the block characteristic classification unit 12 inputs the code amount of each encoded block of the image A and performs non-hierarchical clustering of one-dimensional data. As a clustering method, for example, a k-means method or the like can be mentioned. The block characteristic classification unit 12 classifies code amount data groups into two clusters according to the k-means method or the like and classifies the code amount data groups into a cluster having a small centroid code amount value (a small cluster) and a cluster having a large centroid code amount value (a large cluster) (step S203). That is, assuming that the code amount of a encoded blocky of the image A is denoted by RA(y), the centroid code amount of the small cluster calculated in the k-means method is denoted by rA1, and the centroid code amount of the large cluster is denoted by rA2, the block characteristic classification unit 12 performs clustering as follows.

If (RA(y)≤(rA1+rA2)/2): the encoded block y is the small cluster,

Else: the encoded block y is the large cluster.

The block characteristic classification unit 12 also performs a process similar to the above on the image B in a similar manner.

Next, the block characteristic classification unit 12 determines whether the encoded block y is classified as either a flat region or a complex region (step S204). For example, the block characteristic classification unit 12 confirms cluster types of the image A and the image B and classifies the encoded blocks y as a flat region and a complex region as described below.

If ( RA(y)≤(rA1+rA2)/2)
&& (RB(y)≤(rB1+rB2)/2): the encoded blocky is the flat region, Else: the encoded block y is the complex region.

Also, as a method of classifying whether the encoded block y is a flat region or a complex region according to a high or low priority, a method of determining priorities of the images A and B by using external information (a photographing date and time, image quality, or the like) of the image A or B as a key and determining region characteristics on the basis of the priorities if a type of cluster is different can be applied in addition to the above-described method.

The processing of step S204 is iterated until the processing is completed on all encoded blocks (step S205).

Subsequently, the change detection unit 4 determines whether or not the characteristic of the encoded block is a flat characteristic (step S206). The change detection unit 4 performs a change determination for a flat characteristic (step S207) if the characteristic of the encoded block is the flat characteristic (step S206: Yes) and performs a change determination for a complex characteristic (step S208) if the characteristic of the encoded block is the complex characteristic (Step S206: No).

The processing of steps S206 to S208 is iterated until the processing is completed on all encoded blocks (step S209).

Here, the change determination for the flat characteristic in step S207 and the change determination for the complex characteristic in step S208 can be performed as follows.

(1) When a code amount value and a code amount variance value are used as an index in the flat region and only a code amount value is used as an index in the complex region Threshold values for the change determination in the flat region are assumed to be a code amount threshold value r'TH and a code amount variance threshold value vTH and a threshold value for change determination in the complex region is assumed to be a code amount threshold value r"TH. At this time, if the encoded blocky is a flat region, the change detection unit 4 determines whether or not there is a change in the encoded block y according to the following determination expression.

If (|RA(y)−RB(y)|≤r'TH)
&& (VA(y)≤vTH)
&& (VB(y)≤vTH): there is no change in the encoded block y, Else: there is a change in the encoded block y.

Also, if the encoded block y is a complex region, the change detection unit 4 determines whether or not there is a change in the encoded block y according to the following determination expression.

If (|RA(y)−RB(y)|≤r"TH): there is no change in the encoded block y,

Else: there is a change in the encoded block y.

Here, VA(y) and VB(y) denote variance values of code amounts of an encoded block around the encoded blocky of the image A and the image B and the encoded block y. For example, the change detection unit 4 calculates a variance value from code amount values of p vertically and horizontally adjacent encoded blocks ((2p+1)*(2p+1) encoded blocks) around the encoded block y. p is pre-specified from outside.

(2) When only a code amount value is used as an index for both the flat region and the complex region The threshold value for the change determination in the flat region is assumed to be the code amount threshold r'TH and the threshold value for the change determination in the complex region is assumed to be the code amount threshold value r"TH. At this time, if the encoded blocky is the flat region, the change detection unit 4 determines whether or not there is a change in the encoded block according to the following determination expression.

If (|RA(y)−RB(y)|≤r'TH): there is no change in the encoded blocky,

Else: there is a change in the encoded block y.

When the encoded block y is the complex region, the change detection unit 4 determines whether or not there is a change in the encoded block according to the following determination expression.

If (|RA(y)−RB(y)|≤r"TH): there is no change in the encoded block y,

Else: there is a change in the encoded block y.

As an example, if the encoded block is the flat region, the change detection unit 4 performs a change determination on encoding information for the predetermined flat region by using a change determination index and a threshold value corresponding thereto. Also, if the encoded block is the complex region, the change detection unit 4 uses one or both of the change determination index and the threshold value different from that of the flat region.

Finally, when the changed region is detected in the processing of steps S206 to S209, the change detection unit 4 outputs a changed region determination result of the entire image (step S210).

<Tenth Embodiment22

Figure 20:
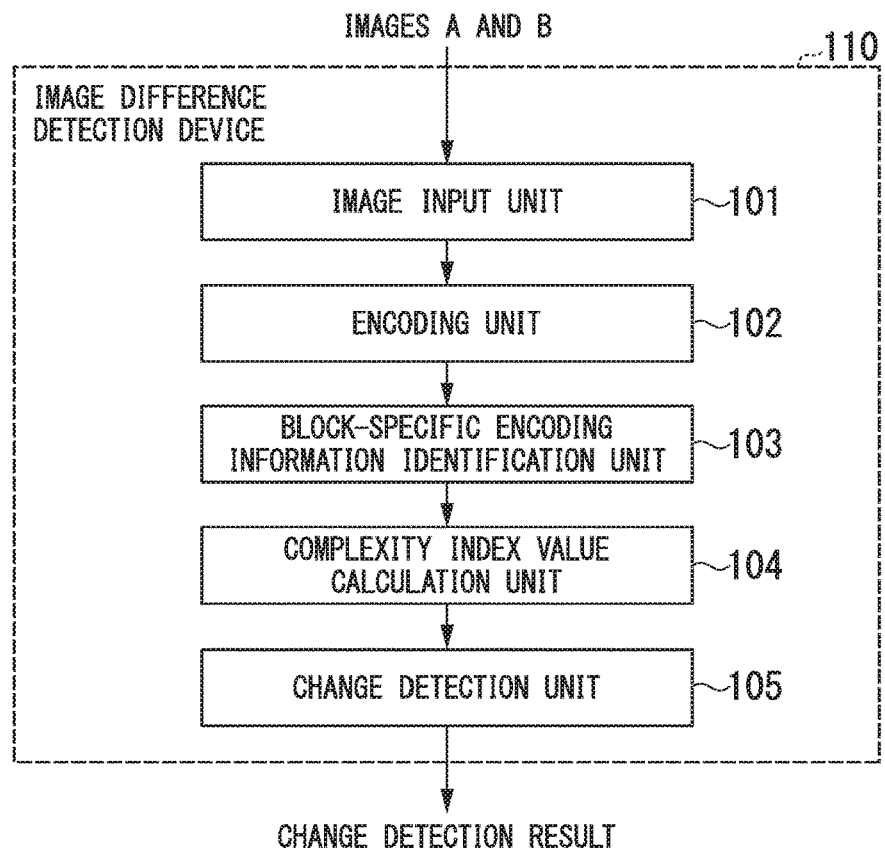
FIG. 20 is a block diagram showing a configuration of an image difference detection device according to a tenth embodiment of the present invention.
Figure 21:
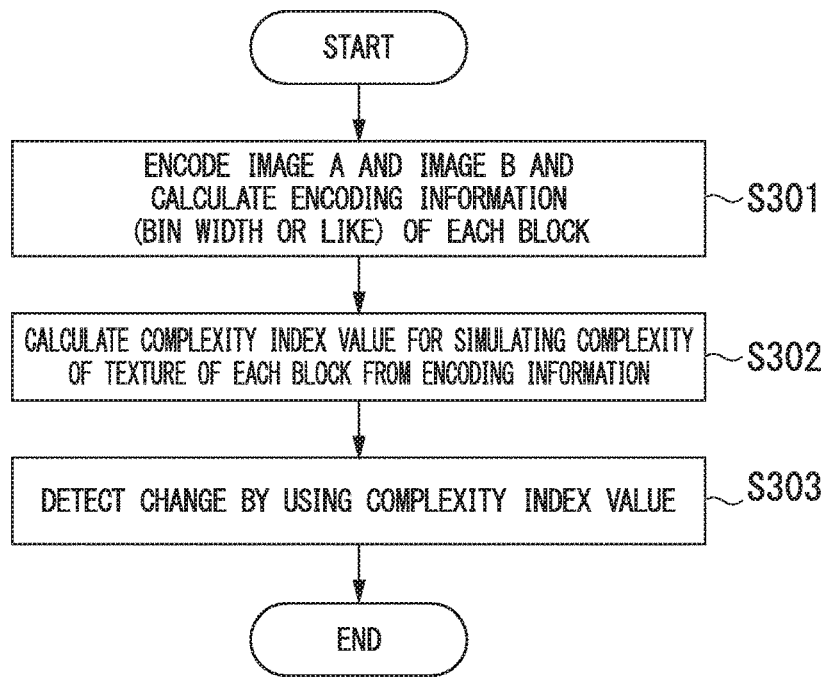
FIG. 21 is a flowchart showing a processing operation of the image difference detection device shown in FIG. 20.

Next, an image difference detection device according to a tenth embodiment will be described. FIG. 20 is a block diagram showing a configuration of an image difference detection device 110 according to the tenth embodiment. As shown in FIG. 20, the image difference detection device 110 according to the tenth embodiment includes an image input unit 101, an encoding unit 102, a block-specific encoding information identification unit 103, a complexity index value calculation unit 104, and a change detection unit 105. FIG. 21 is a flowchart showing a processing operation of the image difference detection device 110 shown in FIG. 20.

In the image difference detection device 110 according to the present embodiment, the image input unit 101 inputs uncompressed images A and B and the encoding unit 102 performs encoding thereon. The images A and B are images having different photographing dates and times but are images having the same spatial region in the photographing range. Then, the block-specific encoding information identification unit 103 identifies various types of encoding information calculated during encoding.

The complexity index value calculation unit 104 calculates a complexity index value from the encoding information. Then, the change detection unit 105 identifies a changed region by using the complexity index value.

Next, the processing operation of the image difference detection device 110 shown in FIG. 20 will be described with reference to the flowchart of FIG. 21. First, the image input unit 101 inputs the image A and the image B, and the encoding unit 102 encodes the image A and the image B (step S301). For encoding, HEVC, H.264, JPEG, and the like are used. Next, the block-specific encoding information identification unit 103 records various types of encoding information calculated during encoding and saves the recorded encoding information in a memory region as a log. As the encoding information for calculating the complexity index value, the following can be used.

Code amount in the encoded block (CU, CTU)
Binary bit value width (bin) in the encoded block (CU, CTU)
DCT coefficient in the encoded block (CU, CTU)

Subsequently, the complexity index value calculation unit 104 calculates a complexity index value from the encoding information (step S302). As the complexity index value, the following encoding information or a weighted sum thereof can be applied as an index value. The index value obtained by the weighted sum is, for example, a value obtained by adding a squared value or an absolute value of the difference between the parameter of the image A and the parameter of the image B for each parameter included in the encoding information or a value obtained by weighted-adding a squared value or an absolute value of the difference between the parameter of the image A and the parameter of the image B for each parameter included in the encoding information.

Total code amount in the encoded block (CU, CTU)
Code amount related to a DCT coefficient in the encoded block (CU, CTU)
Code amount of each of Y/Cb/Cr in the encoded block (CU, CTU)
Binary bit value width (bin) in the encoded block (CU, CTU)
DCT coefficient value or number of significant coefficients in the encoded block (CU, CTU)

Next, the change detection unit 105 performs change detection using this complexity index value (step S303). The change detection method is similar to that of the above-described embodiment.

As described above, the image difference detection devices of the first embodiment to the ninth embodiment compare code amounts to identify a changed region. On the other hand, the image difference detection device of the tenth embodiment compares complexity index values.

<Eleventh Embodiment>

Figure 22:
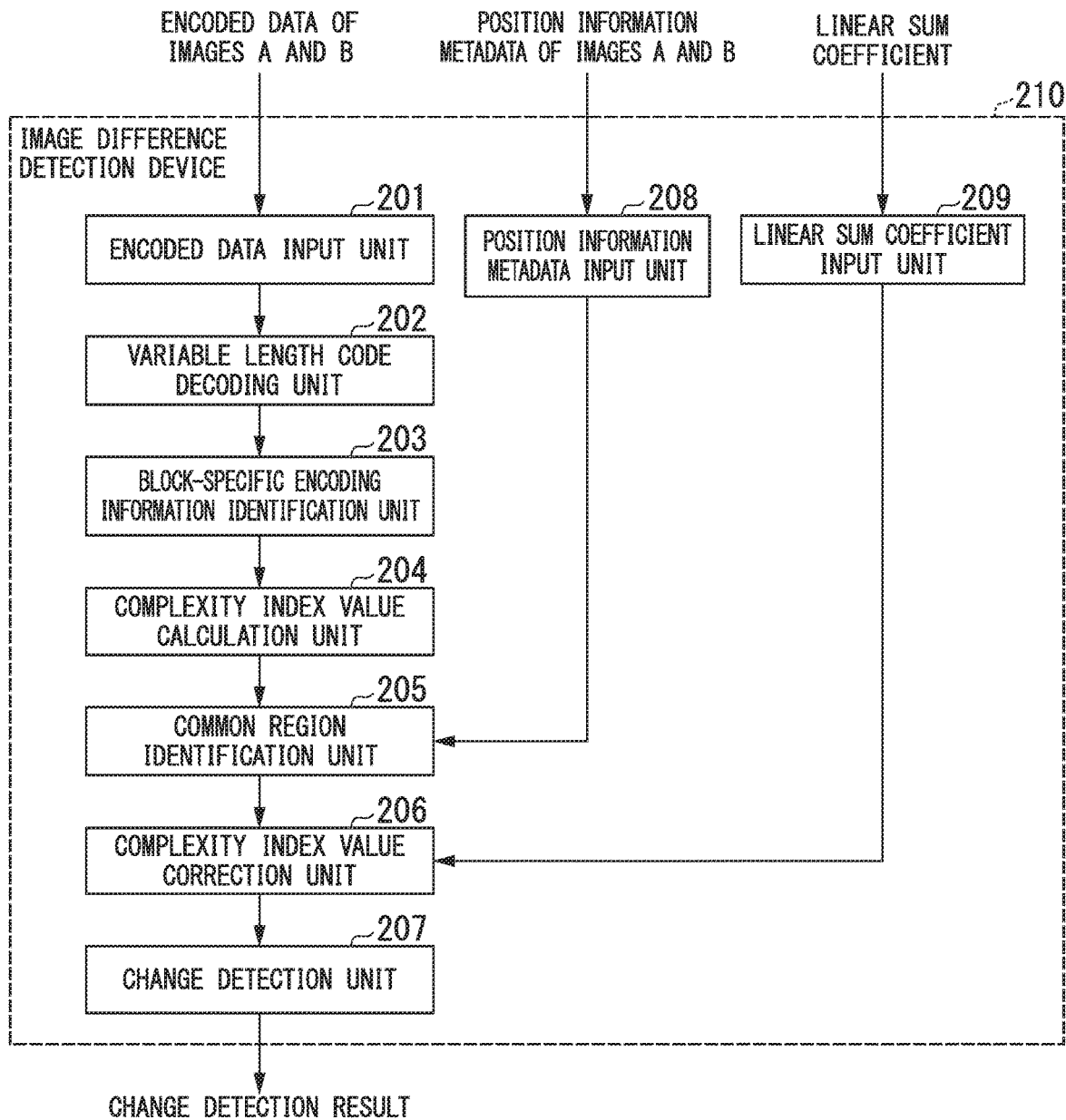
FIG. 22 is a block diagram showing a configuration of an image difference detection device according to an eleventh embodiment of the present invention.
Figure 23:
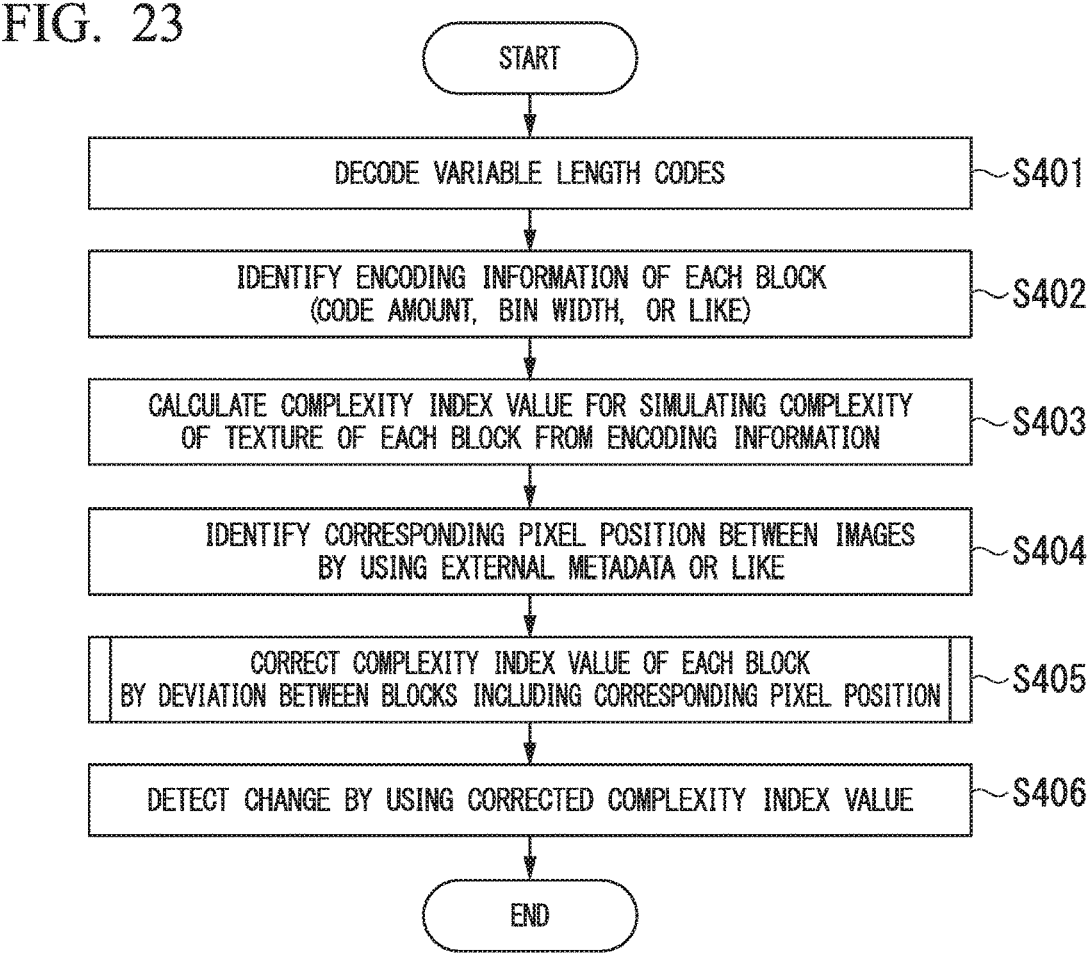
FIG. 23 is a flowchart showing a processing operation of the image difference detection device shown in FIG. 22.

Next, an image difference detection device according to an eleventh embodiment will be described. FIG. 22 is a block diagram showing a configuration of an image difference detection device 210 according to the eleventh embodiment. FIG. 23 is a flowchart showing a processing operation of the image difference detection device 210 shown in FIG. 22. The image difference detection device 210 shown in FIG. 22 may include a computer device. The image difference detection device 210 includes an encoded data input unit 201, a variable length code decoding unit 202, a block-specific encoding information identification unit 203, a complexity index value calculation unit 204, a common region identification unit 205, a complexity index value correction unit 206, a change detection unit 207, a position information metadata input unit 208, and a linear sum coefficient input unit 209.

In each of the above-described first to tenth embodiments, uncompressed images are input as an image A and an image B. On the other hand, in the present embodiment, the encoded data input unit 201 inputs encoded data of the encoded images A and B. The images A and B are images with different photographing dates and times, but are images having the same spatial region in a photographing range. As the encoding scheme, HEVC, H.264, MPEG 2, MPEG JPEG and the like are used. The variable length code decoding unit 202 decodes variable length codes with respect to the encoded data of the encoded images A and B. The block-specific encoding information identification unit 203 identifies various types of encoding information calculated during decoding. The complexity index value calculation unit 204 calculates a complexity index value for simulating complexity of texture of each encoded block from various types of encoding information calculated during decoding. That is, the variable length code decoding unit 202 operates as an acquisition unit configured to acquire encoding information of each of the encoded blocks by completing the decoding of the variable length code. The decoding of the variable length code is a part of processing performed in the process of decoding the image from the encoded data.

The position information metadata input unit 208 inputs global position information serving as external information as metadata. The common region identification unit 205 identifies the same subject in the image A and the image B as a common region. The complexity index value correction unit 206 calculates a complexity index value in the common region of the image A and the image B. The complexity index value correction unit 206 has a filter configured to perform linear sum computation of calculating the complexity index value in the common region. The linear sum coefficient input unit 209 inputs a coefficient of the linear sum computation. The same subject is a region determined to have the same position between image files where position information is saved according to position information between image files. That is, the same subject is a region determined to be substantially the same space. Also, the position information stored in the image file may be separately acquired. Also, the image file may be a satellite image, an aerial photo, or an image captured by a commercially available digital camera, a mobile phone, or the like.

Next, the processing operation of the image difference detection device 210 shown in FIG. 22 will be described with reference to the flowchart of FIG. 23.

First, the encoded data input unit 201 inputs encoded data of the encoded image A and encoded data of the image B. The variable length code decoding unit 202 decodes variable length codes with respect to the encoded data (step S401). Next, the block-specific encoding information identification unit 203 identifies encoding information held by each encoded block (step S402), and the complexity index value calculation unit 204 calculates a complexity index value on the basis of the identified encoding information (step S403).

As the encoding scheme of the encoded data of the input images A and B, HEVC, H.264, JPEG, and the like can be conceived. In these encoding schemes, one screen is divided into a plurality of encoded blocks, predictive encoding is performed according to intra- or inter-prediction in units of encoded blocks and orthogonal codes of a DCT or the like, and an encoding scheme of performing compressed encoding on codes of each encoded block according to a variable length code is used. As the variable length code, a binary arithmetic code is used in HEVC or H.264. In JPEG, a Huffman code is used. Therefore, the above-described processing of steps S401 to S403 specifically becomes processing as follows in accordance with the encoding scheme.

(1) When encoded data encoded in HEVC or H.264 is input

Figure 24:
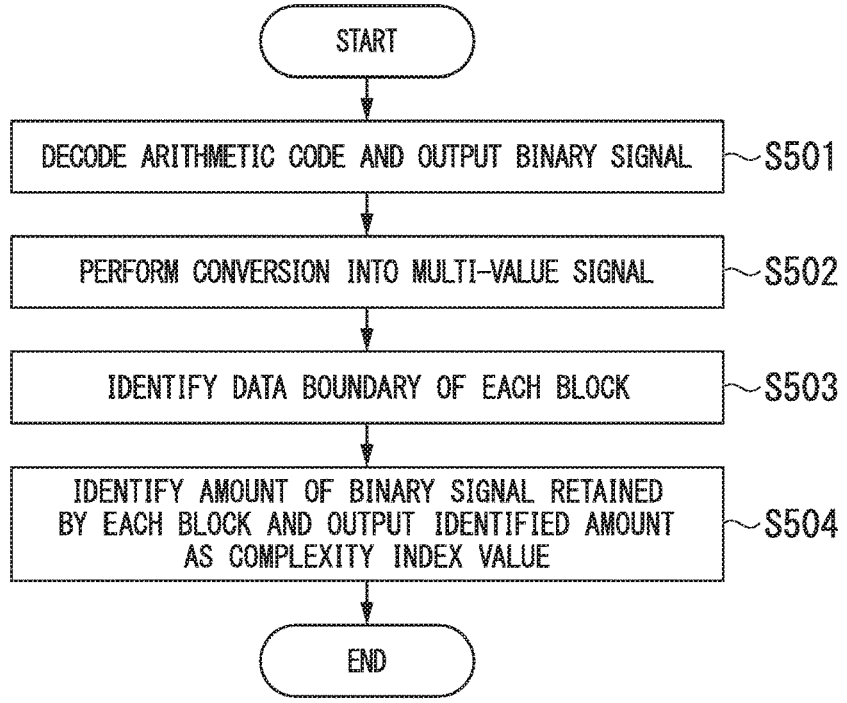
FIG. 24 is a flowchart showing a processing operation of obtaining an index value from encoded data encoded by HEVC or H.264 in the processing operation shown in FIG. 23.

FIG. 24 is a flowchart showing a processing operation of obtaining a complexity index value from encoded data encoded in HEVC or H.264. First, the variable length code decoding unit 202 decodes an arithmetic code (CABAC) to acquire a binary signal (step S501). Then, the variable length code decoding unit 202 acquires each syntax element and converts the binary signal into a multi-value signal (step S502). Next, the block-specific encoding information identification unit 203 identifies the encoding information held by each encoded block (CU, CTU) (step S503). For example, the following information can be used as encoding information.

Code amount in the encoded block (CU, CTU)
Binary value bit width (bin) in the encoded block (CU, CTU)
DCT coefficient in the encoded block (CU, CTU)

Subsequently, on the basis of the encoding information, the complexity index value calculation unit 204 calculates a complexity index value that is an index value reflecting the structure of the encoded block constituting the subject (step S504). As the complexity index value, for example, the following values, a weighted sum thereof, or the like can be applied. The index value obtained by the weighted sum is, for example, a value obtained by adding a squared value or an absolute value of the difference between the parameter of the image A and the parameter of the image B for each parameter included in the encoding information or a value obtained by weighted-adding a squared value or an absolute value of the difference between the parameter of the image A and the parameter of the image B for each parameter included in the encoding information.

Total code amount in the encoded block (CU, CTU)
Code amount related to a DCT coefficient in the encoded block (CU, CTU)
Code amount of each of Y/Cb/Cr in the encoded block (CU, CTU)
Binary bit value width (bin) in the encoded block (CU, CTU)
DCT coefficient value or number of significant coefficients in the encoded block (CU, CTU)

(2) When encoded data encoded in JPEG is input

Figure 25:
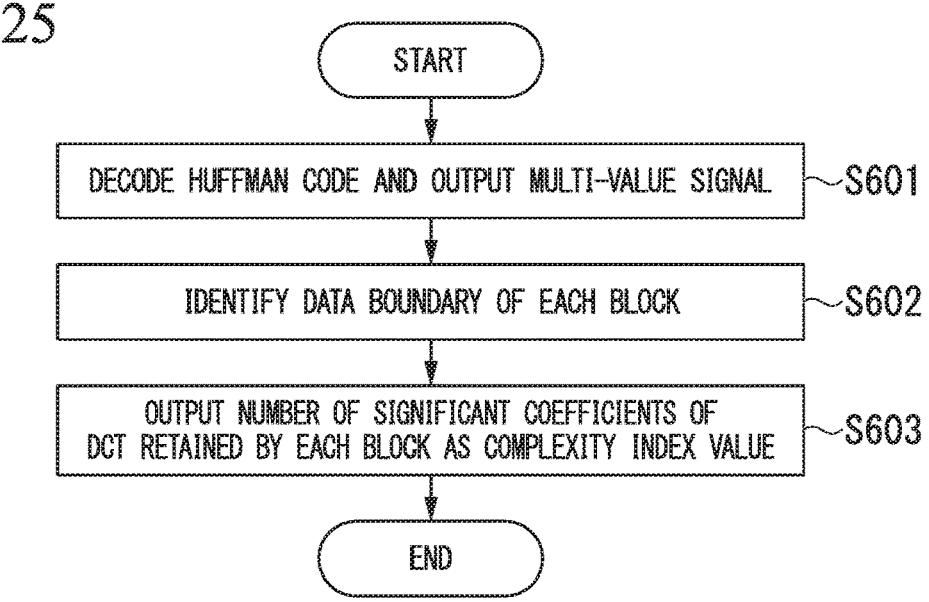
FIG. 25 is a flowchart showing a processing operation of obtaining an index value from encoded data encoded by JPEG in the processing operation shown in FIG. 23.

FIG. 25 is a flowchart showing a processing operation of obtaining a complexity index value from encoded data encoded in JPEG First, the variable length code decoding unit 202 decodes a Huffman code and outputs a multi-value signal (step S601). Next, the block-specific encoding information identification unit 203 identifies a data boundary of each encoded block (8×8) (step S602). Subsequently, the complexity index value calculation unit 204 outputs a DCT coefficient value, the number of significant coefficients, or the like retained by each encoded block as a complexity index value (step S603).

In the processing shown in FIG. 23, when the complexity index value is calculated in steps S401 to S403, the common region identification unit 205 inputs position information metadata from the position information metadata input unit 208, identifies a positionally corresponding pixel position between images by using the position information metadata, and derives a common region between images (step S404). As the position information metadata, geographical position information in which coordinates in the image is indicated by latitude and longitude, a UTM coordinate system, or the like is used if a target image is a satellite image or the like.

Subsequently, the complexity index value correction unit 206 identifies an encoded block including a corresponding pixel position in each image and corrects a complexity index value by a position difference (deviation) between encoded blocks (step S405).

Figure 26:
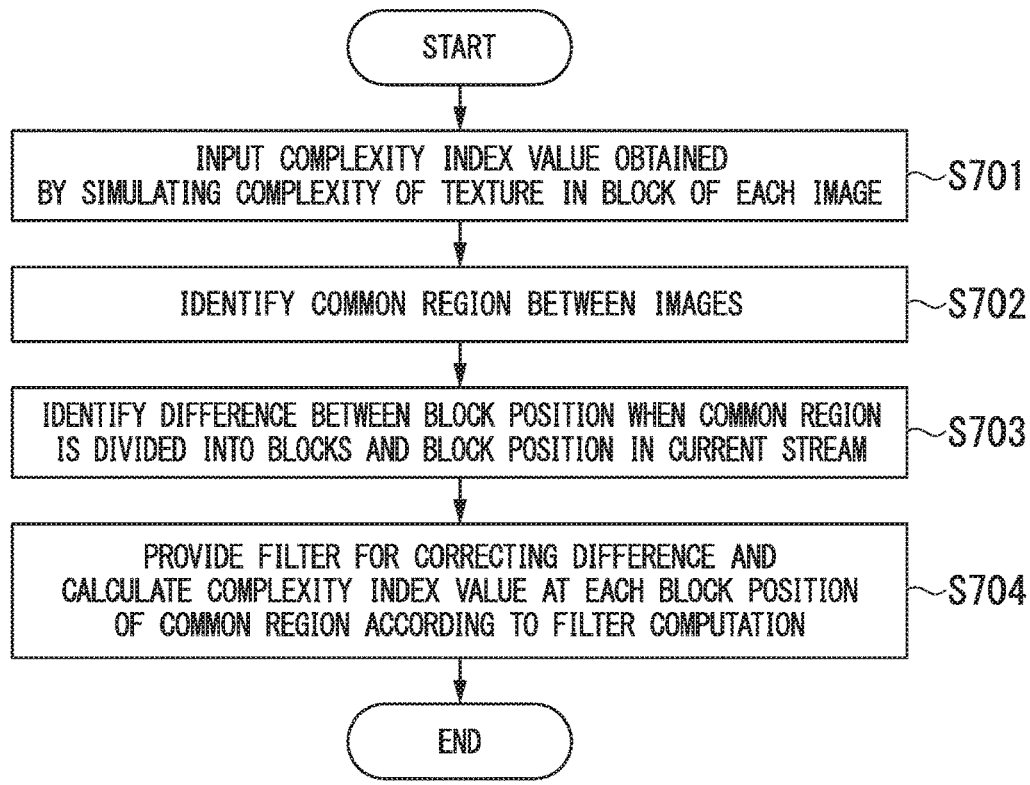
FIG. 26 is a flowchart showing a process of correcting a complexity index value in a common region in the processing operation shown in FIG. 23.
Figure 27:
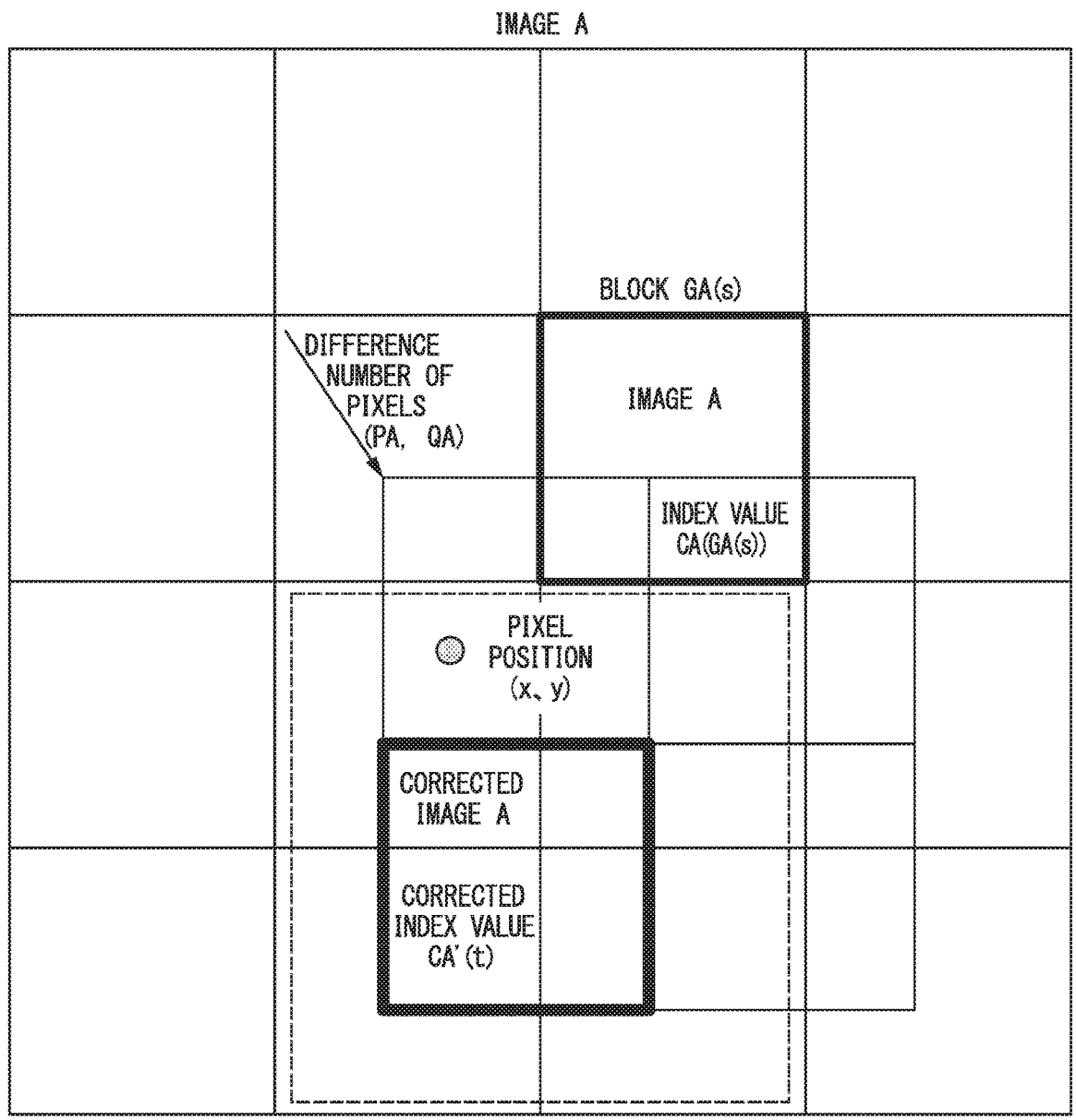
FIG. 27 is an explanatory diagram of a process of correcting a complexity index value in a common region.

FIG. 26 is a flowchart showing a process of correcting the complexity index value in the common region in step S405 shown in FIG. 23. Also, FIG. 27 is a diagram showing an example of the process of correcting the complexity index value in the common region.

First, the complexity index value correction unit 206 inputs a complexity index value indicating the complexity of texture in each of encoded blocks of an image A and an image B (step S701). As shown in FIG. 27, when an encoded block of the image A is denoted by $G_A$ (s), its complexity index value is denoted by $C_A$ ($G_A$(s)). Here, s denotes a number when the permutation of an encoded block is determined in a raster scan order from the upper left of the image. Likewise, the complexity index value of the image B is defined by $C_B$ ($G_B$(s)).

Next, the complexity index value correction unit 206 identifies a common region (a geographically overlapping region) between the images identified by the external information (step S702). The common region is shown as a pixel region (range). The common region between the image A and the image B is assumed to be k1≤x≤k2 and l1≤y≤l2 in the image A and is assumed to be m1≤x≤m2 and n1≤y≤n2 in the image B. Here, (x, y) is a value indicating a pixel position.

Subsequently, the complexity index value correction unit 206 identifies a position difference (the difference number of pixels) between an encoded block position when only the common region is assumed to be encoded as an image and an encoded block position actually encoded on encoded data of each of the image A and the image B (step S703). Here, as shown in FIG. 27, the difference number of pixels of an encoded block position of the image A is denoted by ($P_A$, $Q_A$).

Finally, the complexity index value correction unit 206 calculates a complexity index value at each encoded block position of the common region according to filtering computation and corrects the complexity index value (step S704). When the complexity index value of an encoded block t in the common region of the image A after the correction is denoted by $C_A'$(t), $C_A'$(t) is described as follows.

$$C_A'(t)=\Sigma\alpha(s, P_A, Q_A)*C_A(G_A(s))$$

Here, α is a coefficient corresponding to the difference number of pixels. That is, in this example, the corrected complexity index value is calculated as a linear sum of the original complexity index value group. The complexity index value correction unit 206 also calculates the corrected complexity index value for the image B in a similar procedure. Also, a linear sum coefficient a is determined so that 0≤α(s, $P_A$, $Q_A$)≤1 is changed in accordance with a pixel position and is given from outside so that Σα=1. An encoded block serving as a target of filter computation is, for example, an encoded block that is a region overlapping the encoded block t among encoded blocks in the encoded data.

A coefficient of linear computation when complexity index values of the image A and the image B are corrected on the basis of a position difference is input as a coefficient corresponding to the above-described position difference to the linear sum coefficient input unit 209 and is set as a coefficient for correcting displacement due to the encoded block. Also, when a plurality of coefficients for performing linear computation are pre-stored, the complexity index value correction unit 206 may select a coefficient corresponding to the position difference from among the stored coefficients. Also, nonlinear computation may be used for filter computation for $C_A'$ from the complexity index value $C_A$. Filter coefficients may be pre-stored in the image difference detection device 210. In this case, the complexity index value correction unit 206 may perform filter computation using this filter coefficient. At this time, different filter computation (for example, nonlinear computation) may be used.

As shown in FIG. 27, the complexity index value $C_A'$(t) of the encoded block t in the common region is obtained by performing linear computation on the basis of the difference number of pixels ($P_A$, $Q_A$) with respect to the complexity index value $C_A$($G_A$(s)) of the encoded block $G_A$(s) of the image A. Likewise, the complexity index value $C_B'$ (t) of the encoded block tin the common region is obtained by performing linear computation on the basis of the difference number of pixels ($P_B$, $Q_B$) with respect to the complexity index value $C_B$($G_B$(s)) of the encoded block $G_B$(s) of the image B.

In FIG. 23, when the complexity index values of the image A and the image B are corrected in step S405, the change detection unit 207 identifies the same common region between the image A and the image B by using the corrected complexity index values and detects a change in the common region (step S406). A process of detecting a change by using the corrected complexity index value is similar to those of the other embodiments.

Also, although a case in which a change is detected between two or more images with different photographing dates and times has been described in each embodiment, the image difference detection device according to each embodiment is not limited to a photographing place or date and time and can be applied to a field of application for detecting a difference between two or more images.

As described above, by comparing images of the same spatial region with different photographing dates and times in satellite images, aerial images, medical images, or the like, it is possible to quickly detect a changed region (a position where there is a difference).

The image difference detection device according to the eleventh embodiment does not complete the decoding of the encoded data when an image change is detected from the encoded images A and B and obtains a complexity index value from encoding information obtained during decoding to detect a changed region. That is, a general image encoding scheme includes the step of dividing one screen into a plurality of encoded blocks and performing predictive encoding according to intra- or inter-prediction in units of encoded blocks and orthogonal codes and the step of performing compressed encoding on encoded data for each encoded block according to variable length codes. Therefore, the step of decoding variable length codes and the step of decoding orthogonal codes are necessary to decode an image and an amount of computation is increased. The image difference detection device according to the eleventh embodiment detects a changed region by obtaining a complexity index value from the encoding information obtained in the step of decoding only the variable length codes. Thus, the amount of computation at when a difference between images given as encoded data is detected is significantly reduced and a high-speed operation is possible.

In each embodiment, in place of the detection of the difference based on the encoded block, the difference based on the detected block may be detected. If the size of the detected block is the same as the size of the encoded block, the image difference detection device performs the same process. If the size of the detected block is different from the size of the encoded block, the image difference detection device calculates a detected block code amount or index value on the basis of an encoding amount or an index value of the encoded block. For example, if the size of the encoded block is smaller than the size of the detected block, the image difference detection device adds the code amount or the index value of each of the encoded blocks included in the detected block, so that the code amount or the index value of the detected block is calculated. If the size of the encoded block is larger than the size of the detected block, the image difference detection device multiplies the code amount or the index value of the encoded block including the detected block by a ratio of an area of the detected block to an area of the encoded block, and a value obtained through the multiplication is set as the code amount or the index value of the detected block. That is, if the size of the encoded block is different from the size of the detected block, the image difference detection device performs linear computation according to the difference or the ratio between the sizes of the encoded block and the detected block on the code amount or the index value of the encoded block to obtain the code amount or the index value of the detected block. A process of calculating the code amount or the index value of the encoded block in accordance with a size difference is performed by the change detection unit, the block characteristic classification unit, or the complexity index value calculation unit.

For example, the addition of the index value when the DCT coefficient is used as the index value indicates computation of extracting a predetermined number of DCT coefficients on the high frequency side for each encoded block and calculating a sum of the extracted DCT coefficients. In place of the DCT coefficient on the high frequency side, the DCT coefficient on the low frequency side may be used. Also, a frequency component that noticeably indicates the presence or absence of a difference may be extracted from the DCT coefficient or weighted addition in which a weight for the DCT coefficient is made larger than those of the other DCT coefficients may be performed instead of the sum calculation. Also, if the DCT coefficient is used as the index value, the presence or absence of the difference may be detected on the basis of the number of DCT coefficients whose absolute values exceed a predetermined threshold value. That is, the presence or absence of the difference may be determined according to the number of significant DCT coefficients having power exceeding the threshold value.

Also, as the encoding scheme used in each embodiment, for example, it is also possible to use AVC, MPEG MPEG-2, JPEG or the like in addition to HEVC. Furthermore, it is also possible to detect a difference for each region divided in a size larger or smaller than that of the macroblock or the encoding size and a similar effect is obtained. Also, it is possible to use an average value/maximum value of activities of each region, a DC coefficient obtained by a DCT and information obtained by an encoding result such as each encoding mode instead of the code amount as the encoding information and a similar effect is obtained.

Also, although an example in which a change is detected between two or more images with different photographing dates and times has been described above, the image difference detection device according to each of the above-described embodiments is not limited to a photographing place or date and time and can be applied to a field of application for detecting a difference between two or more images.

Also, although the configuration of the image difference detection device that identifies a small region having a difference by using an encoding scheme in which a region is divided into rectangular small regions (encoded blocks) has been described, the identification of the region is not indispensable and the image difference detection device may simply detect that there is a difference between two images according to a difference in a code amount.

Also, the image difference detection device according to each embodiment determines a change by comparing code amounts. Because the entire amount of information is significantly changed if a sense of detail is different between images even when the images to be compared are captured from the same point, a "process of approximating the total code amount" is performed as a premise.

Also, the image difference detection device according to each embodiment can be used irrespective of an encoding standard. The effect is prominent when the encoding scheme is a "variable bit rate."

Also, the image difference detection device according to each of the above-described embodiments can be used together with other technologies.

Also, a change determination in each of the above-described embodiments can be used with the ordinary encoding as a set as well as for a change determination. Therefore, the above-described image difference detection device may achieve other objectives.

As described above, by comparing images of the same spatial region with different photographing dates and times in satellite images, aerial images, medical images, or the like, it is possible to quickly detect a changed region (a position where there is a difference).

Compared with the conventional technology for detecting a change between images, the image difference detection device of each embodiment using the code amount as an index can detect a difference at a high speed and reduce an amount of computation required for detection. When the image difference detection devices according to the conventional technology and each embodiment are compared in an environment similar to that of the conventional technology, a time required until a result is output is consequently greatly shortened.

The image difference detection device in the above-described embodiment may be implemented by a computer. In this case, functions thereof may be implemented by recording a program for implementing the functions on a computer-readable recording medium and causing a computer system to read and execute the program recorded on the recording medium. Also, the "computer system" described here is assumed to include an operating system (OS) and hardware such as peripheral devices. Also, the "computer-readable recording medium" refers to a storage device including a flexible disk, a magneto-optical disc, a read only memory (ROM), a portable medium such as a compact disc (CD)-ROM, and a hard disk embedded in the computer system. Further, the "computer-readable recording medium" is assumed to include a computer-readable recording medium for dynamically retaining a program for a short time as in a communication line when the program is transmitted via a network such as the Internet or a communication circuit such as a telephone circuit and a computer-readable recording medium for retaining the program for a predetermined time as in a volatile memory inside the computer system including a server and a client when the program is transmitted. Also, the above-described program may be used to implement some of the above-described functions. Further, the program may implement the above-described functions in combination with a program already recorded on the computer system or may be implemented using a programmable logic device such as a field programmable gate array (FPGA).

Although embodiments of the present invention have been described above with reference to the drawings, specific configurations are not limited to the embodiments, and design changes and the like may also be included without departing from the scope of the present invention. For example, an embodiment may be implemented by combining configurations of a plurality of embodiments.

INDUSTRIAL APPLICABILITY

The present invention can also be applied to a field of application for detecting a difference between two or more images at a higher speed.

REFERENCE SIGNS LIST 10A, 10B, 10C, 10D, 10E, 10F, 10G, 10H, 110, 201 Image difference detection device
1 Change detection target size input unit
2 Encoding parameter determination unit
3, 102 Encoding unit
4,105,207 Change detection unit
5,101 Image input unit
6 Change detection target type input unit
7 Encoding result adjustment unit
8 Image analysis unit
9 Encoding change detection target region extraction processing unit
11 Starting point candidate input unit
12 Block characteristic classification unit
13 Region-specific used encoding information/threshold value input unit
103 Block-specific encoding information identification unit
104, 204 Complexity index value calculation unit
201 Encoded data input unit
202 Variable length code decoding unit
203 Block-specific encoding information identification unit
205 Common region identification unit
206 Complexity index value correction unit
208 Position information metadata input unit
209 Linear sum coefficient input unit

The invention claimed is:

1. An image difference detection device comprising:
a detection unit configured to detect presence or absence of a difference between a first region within a first image and a second region corresponding to the first region within a second image on a basis of one or both of a code amount of each of encoded blocks in first and second encoded data obtained by encoding the first image and the second image and an index value obtained from encoding information of each of the encoded blocks.

2. The image difference detection device according to claim 1, wherein a variable length code is used in encoding used when the first and second encoded data is obtained.

3. The image difference detection device according to claim 1 further comprising:
an encoding information acquisition unit configured to acquire the encoding information of each of the encoded blocks from the first and second encoded data,
wherein the detection unit is further configured to determine the presence or absence of the difference between the first region and the second region on a basis of the index value obtained from the encoding information acquired by the encoding information acquisition unit.

4. The image difference detection device according to claim 1 further comprising:
an input unit configured to input information for identifying each of the first and second regions between which the presence or absence of the difference is detected in the first and second images; and
a region identification unit configured to identify each of the encoded blocks corresponding to the first and second regions identified on a basis of the information input by the input unit,
wherein the detection unit is further configured to detect the presence or absence of the difference between the first and second regions identified on a basis of one or both of the code amount of the encoded block identified by the region identification unit and the index value obtained from the encoding information.

5. The image difference detection device according to claim 4, wherein the input unit is further configured to input position information indicating a position where there is a subject serving as a detection target of the difference in the first and second images as information for identifying the first and second regions.

6. The image difference detection device according to claim 1, further comprising:
a classification unit configured to classify the encoded blocks into a plurality of categories on a basis of the encoding information obtained when a plurality of encoded blocks obtained by dividing each of the first and second images are encoded,
wherein the detection unit is further configured to determine a threshold value for use in a determination of the presence or absence of the difference between the first region and the second region on a basis of a classification result of the classification unit, and
wherein the detection unit is further configured to determine the presence or absence of the difference between the first region and the second region on a basis of one or both of the code amount and the index value and the determined threshold value.

7. The image difference detection device according to claim 1, further comprising:
a classification unit configured to classify the encoded blocks into a plurality of categories on a basis of the encoding information obtained when a plurality of encoded blocks obtained by dividing each of the first and second images are encoded,
wherein the detection unit is further configured to determine a determination condition for use in a determination of the presence or absence of the difference between the first region and the second region on a basis of a classification result of the classification unit, and
wherein the detection unit is further configured to determine the presence or absence of the difference between the first region and the second region on a basis of one or both of the code amount and the index value and the determined determination condition.

8. The image difference detection device according to claim 6, wherein the classification unit is further configured to classify the encoded blocks into the plurality of categories on a basis of a degree of complexity of an image obtained from the encoding information.

9. The image difference detection device according to claim 6,
wherein the plurality of categories include a flat region and a complex region, and
wherein the classification unit is further configured to classify each of the encoded blocks as the flat region or the complex region on a basis of the degree of complexity of an image obtained from the encoding information.

10. The image difference detection device according to claim 1, further comprising:
- a type input unit configured to input type information indicating a characteristic of the difference detected between the first and second images;
- a parameter determination unit configured to determine a quantization matrix on a basis of the type information; and
- an encoding unit configured to divide each of the first and second images into a plurality of encoded blocks, and encode each of the plurality of encoded blocks on a basis of the quantization matrix to generate the first and second encoded data.

11. The image difference detection device according to claim 1, further comprising:
- a starting point input unit configured to input a plurality of starting points at which encoding starts in the first and second images; and
- an encoding unit configured to divide each of the first and second images into a plurality of encoded blocks on a basis of the starting points and encode the encoded blocks to generate the first and second encoded data for each starting point,
- wherein the detection unit is further configured to determine the presence or absence of the difference between the first region and the second region on a basis of the index value obtained from the encoding information calculated for each encoded block in a process of encoding each of the first and second images.

12. The image difference detection device according to claim 1, further comprising:
- a correction unit configured to correct the index value on a basis of a difference between a position of the encoded block in the first image and a position of the encoded block in the second image when the first and second images are encoded,
- wherein the detection unit is further configured to determine the presence or absence of the difference between the first region and the second region on a basis of the index value corrected by the correction unit.

13. The image difference detection device according to claim 12, wherein the correction unit is further configured to select at least one coefficient from a plurality of predetermined coefficients on a basis of the difference and correct the index value by using the selected coefficient.

14. The image difference detection device according to claim 1, further comprising:
- an adjustment unit configured to adjust a code amount of each of the encoded blocks in the first encoded data or the second encoded data on a basis of a ratio between total code amounts of the first and second encoded data,
- wherein the detection unit is further configured to determine the presence or absence of the difference between the first region and the second region on a basis of the code amount adjusted by the adjustment unit.

15. The image difference detection device according to claim 14, wherein the adjustment unit is further configured to determine that the first image and the second image are entirely different images or that detection of the difference therebetween is impossible if the ratio between the total code amounts of the first and second encoded data exceeds a predetermined value.

16. An image difference detection method comprising:
- a detection step of detecting presence or absence of a difference between a first region within a first image and a second region corresponding to the first region within a second image on a basis of one or both of a code amount of each of encoded blocks in first and second encoded data obtained by encoding the first image and the second image and an index value obtained from encoding information of each of the encoded blocks.

17. A non-transitory computer-readable medium storing a computer program, the computer program configured to cause a computer to function as:
- a detection unit configured to detect presence or absence of a difference between a first region within a first image and a second region corresponding to the first region within a second image on the basis of one or both of a code amount of each of encoded blocks in first and second encoded data obtained by encoding the first image and the second image and an index value obtained from encoding information of each of the encoded blocks.

* * * * *